(12) United States Patent
Thvar

(10) Patent No.: US 11,547,942 B1
(45) Date of Patent: Jan. 10, 2023

(54) VOICE SEPARATED SERVER ARCHITECTURE SYSTEMS FOR PRIVACY OF MASSIVELY MULTIPLAYER ONLINE GAMES

(71) Applicant: Liftnow Foundation, Los Altos, CA (US)

(72) Inventor: Varun Thvar, Los Altos, CA (US)

(73) Assignee: Liftnow Foundation, Los Altos, CA (US)

(*) Notice: Subject to any disclaimer, the term of this patent is extended or adjusted under 35 U.S.C. 154(b) by 0 days.

(21) Appl. No.: 17/586,605

(22) Filed: Jan. 27, 2022

(51) Int. Cl.
*G06F 3/0481* (2022.01)
*H04L 12/18* (2006.01)
*H04L 29/06* (2006.01)
*A63F 13/71* (2014.01)
*A63F 13/87* (2014.01)

(52) U.S. Cl.
CPC .............. *A63F 13/71* (2014.09); *A63F 13/87* (2014.09); *A63F 2300/401* (2013.01)

(58) Field of Classification Search
CPC ................... A63F 13/352; A63F 13/87; A63F 2300/5533; A63F 2300/8082; G06F 3/165; G06F 16/444; H04L 67/10; H04L 67/131; H04N 7/157; H04N 21/4788
See application file for complete search history.

(56) References Cited

U.S. PATENT DOCUMENTS

| | | | |
|---|---|---|---|
| 2011/0072367 A1* | 3/2011 | Bauer | G06F 3/04815 715/757 |
| 2014/0237393 A1* | 8/2014 | Van Wie | G06F 16/9537 715/757 |

\* cited by examiner

*Primary Examiner* — Lawrence S Galka
(74) *Attorney, Agent, or Firm* — Carr & Ferrell LLP

(57) ABSTRACT

Systems, storage media and apparatus for voice separated server architecture for privacy of a plurality of users of a massively multiplayer online game (MMOG) enabling a gaming computing environment that is separate from a voice channel for the plurality of users of the massively multiplayer online game (MMOG) are disclosed. Some embodiments may include: communicating with a gaming server for a Massively Multiplayer Online Game, the gaming server enabling a Massively Multiplayer Online Game environment, communicating with a voice server for the Massively Multiplayer Online Game, the voice server for the Massively Multiplayer Online Game being completely separate from the gaming server enabling privacy for the plurality of users of the massively multiplayer online game, and providing a MMOG primary voice channel, integrating the MMOG primary voice channel and the Massively Multiplayer Online Game environment, enabling a subsection of the plurality of users to verbally communicate.

18 Claims, 13 Drawing Sheets

VOICE SEPARATED SERVER ARCHITECTURE SYSTEMS FOR PRIVACY OF MASSIVELY MULTIPLAYER ONLINE GAMES

FIELD OF TECHNOLOGY

The present disclosure relates to systems, storage media and apparatus for voice separated server architecture for privacy of a plurality of users of a massively multiplayer online game enabling a gaming computing environment that is separate from a voice channel for the plurality of users of the massively multiplayer online game.

BACKGROUND

Millions of children of afflicted parents are falling through the cracks when the parents of the children get sick. Medical and family support systems focus on the patient and existing support structures cannot cope with supporting the children of sick parents. For example, children afflicted by sick parents include 2.85 million children from at least one parent suffering from cancer and 10 million children from at least one parent suffering with substance abuse (e.g., alcoholism). (Sources: New York Times 2020/01/09; Cancer 116(18): 4395-4401, 2010).

A deep impact on children is manifested in later life problems including a Cycle of Psychological Damage the includes the following manifestations. Disruption of daily routine including sleeping problems and post-traumatic stress. The Cycle of Psychological Damage further includes role changes, with increased responsibility for children and loss of childhood. The Cycle of Psychological Damage also includes emotional problems for children (e.g., aggression and hostility, guilt, fear, anxiety). The Cycle of Psychological Damage further includes that effects social functioning of children such as little "fun"/positive reinforcement and shunning friends due to depression. The Cycle of Psychological Damage further includes fracturing of child/parent relationship such as inability to cope with each other open communication may be blocked. Thus, there is a need for systems and methods to help children cope when their parents are sick.

SUMMARY

One aspect of the present disclosure relates to a system for voice separated server architecture for privacy of a plurality of users of a massively multi player online game (MMOG) enabling a gaming computing environment that is separate from a voice channel for the plurality of users of the massively multi player online game. The system may include one or more hardware processors configured by machine-readable instructions for voice separated server architecture for privacy of a plurality of users of a massively multiplayer online game enabling a gaming computing environment that is separate from a voice channel for the plurality of users of the massively multi player online game. The machine-readable instructions may be configured to communicate with a gaming server for a Massively Multiplayer Online Game, the gaming server enabling a Massively Multiplayer Online Game environment. The machine-readable instructions may be configured to communicate with a voice server for the Massively Multiplayer Online Game, the voice server for the Massively Multiplayer Online Game being completely separate from the gaming server enabling privacy for the plurality of users of the massively multi player online game, and providing a MMOG primary voice channel. The machine-readable instructions may be configured to integrate the MMOG primary voice channel and the Massively Multiplayer Online Game environment, the integrating the MMOG primary voice channel and the Massively Multiplayer Online Game environment enabling a subsection of the plurality of users of the massively multiplayer online game to verbally communicate using audio communications in realtime using the MMOG primary voice channel. The machine-readable instructions may be configured to track a virtual location of each of the plurality of users of the massively multiplayer online game in the Massively Multiplayer Online Game environment. The machine-readable instructions may be configured to determine proximity users of the plurality of users of the massively multi player online game based on the tracking the virtual location of each of the plurality of users of the massively multi player online game in the Massively Multiplayer Online Game environment, the proximity users being in a same virtual location in the Massively Multiplayer Online Game environment as a function of a dynamic threshold. The machine-readable instructions may be configured to add the proximity users of the plurality of users of the massively multiplayer online game to a primary user proximity cluster, the primary user proximity cluster be the subsection of the plurality of users of the massively multi player online game using the MMOG primary voice channel.

Another aspect of the present disclosure relates to a computer-readable storage medium for voice separated server architecture for privacy of a plurality of users of a massively multiplayer online game (MMOG) enabling a gaming computing environment that is separate from a voice channel for the plurality of users of the massively multiplayer online game (MMOG). In some embodiments, the computer-readable storage medium may include instructions being executable by one or more processors to communicate with a gaming server for a Massively Multiplayer Online Game, the gaming server enabling a Massively Multiplayer Online Game environment. In some embodiments, the computer-readable storage medium may include instructions being executable by one or more processors to communicate with a voice server for the Massively Multiplayer Online Game, the voice server for the Massively Multiplayer Online Game being completely separate from the gaming server enabling privacy for the plurality of users of the massively multiplayer online game, and providing a MMOG primary voice channel. In some embodiments, the computer-readable storage medium may include instructions being executable by one or more processors to integrate the MMOG primary voice channel and the Massively Multiplayer Online Game environment, the integrating the MMOG primary voice channel and the Massively Multiplayer Online Game environment enabling a subsection of the plurality of users of the massively multiplayer online game to verbally communicate using audio communications in real-time using the MMOG primary voice channel. In some embodiments, the computer-readable storage medium may include instructions being executable by one or more processors to track a virtual location of each of the plurality of users of the massively multiplayer online game in the Massively Multiplayer Online Game environment. In some embodiments, the computer-readable storage medium may include instructions being executable by one or more processors to determine proximity users of the plurality of users of the massively multiplayer online game based on the tracking the virtual location of each of the plurality of users of the massively multiplayer online game in the Massively Multiplayer Online Game environment, the proximity users being in a same virtual location in the Massively Multiplayer Online Game environment as a function of a dynamic threshold. In some embodiments, the computer-readable storage medium may include instructions being executable by one or more processors to add the proximity users of the plurality of users of the massively multiplayer online game to a primary user proximity cluster, the primary user proximity cluster being the subsection of the plurality of users of the massively multiplayer online game using the MMOG primary voice channel.

Another aspect of the present disclosure relates to an apparatus configured for voice separated server architecture for privacy of a plurality of users of a massively multiplayer online game (MMOG) enabling a gaming computing environment that is separate from a voice channel for the plurality of users of the massively multiplayer online game (MMOG). In some aspects, the apparatus may include at least one memory storing computer program instructions and at least one processor configured to execute the computer program instructions to cause the apparatus at least to perform operations associated with voice separated server architecture for privacy of a plurality of users of a massively multiplayer online game (MMOG) enabling a gaming computing environment that is separate from a voice channel for the plurality of users of the massively multiplayer online game (MMOG). In some aspects, the computer program instructions may include communicating with a gaming server for a Massively Multiplayer Online Game, the gaming server enabling a Massively Multiplayer Online Game environment. In some aspects, the computer program instructions may include communicating with a voice server for the Massively Multiplayer Online Game, the voice server for the Massively Multiplayer Online Game being completely separate from the gaming server enabling privacy for the plurality of users of the massively multiplayer online game, and providing a MMOG primary voice channel. In some aspects, the computer program instructions may include integrating the MMOG primary voice channel and the Massively Multiplayer Online Game environment, the integrating the MMOG primary voice channel and the Massively Multiplayer Online Game environment enabling a subsection of the plurality of users of the massively multiplayer online game to verbally communicate using audio communications in real-time using the MMOG primary voice channel. In some aspects, the computer program instructions may include tracking a virtual location of each of the plurality of users of the massively multiplayer online game in the Massively Multiplayer Online Game environment. In some aspects, the computer program instructions may include determining proximity users of the plurality of users of the massively multiplayer online game based on the tracking the virtual location of each of the plurality of users of the massively multiplayer online game in the Massively Multiplayer Online Game environment, the proximity users being in a same virtual location in the Massively Multiplayer Online Game environment as a function of a dynamic threshold. In some aspects, the computer program instructions may include adding the proximity users of the plurality of users of the massively multiplayer online game to a primary user proximity cluster, the primary user proximity cluster being the subsection of the plurality of users of the massively multiplayer online game using the MMOG primary voice channel.

DETAILED DESCRIPTION

Figure 1:
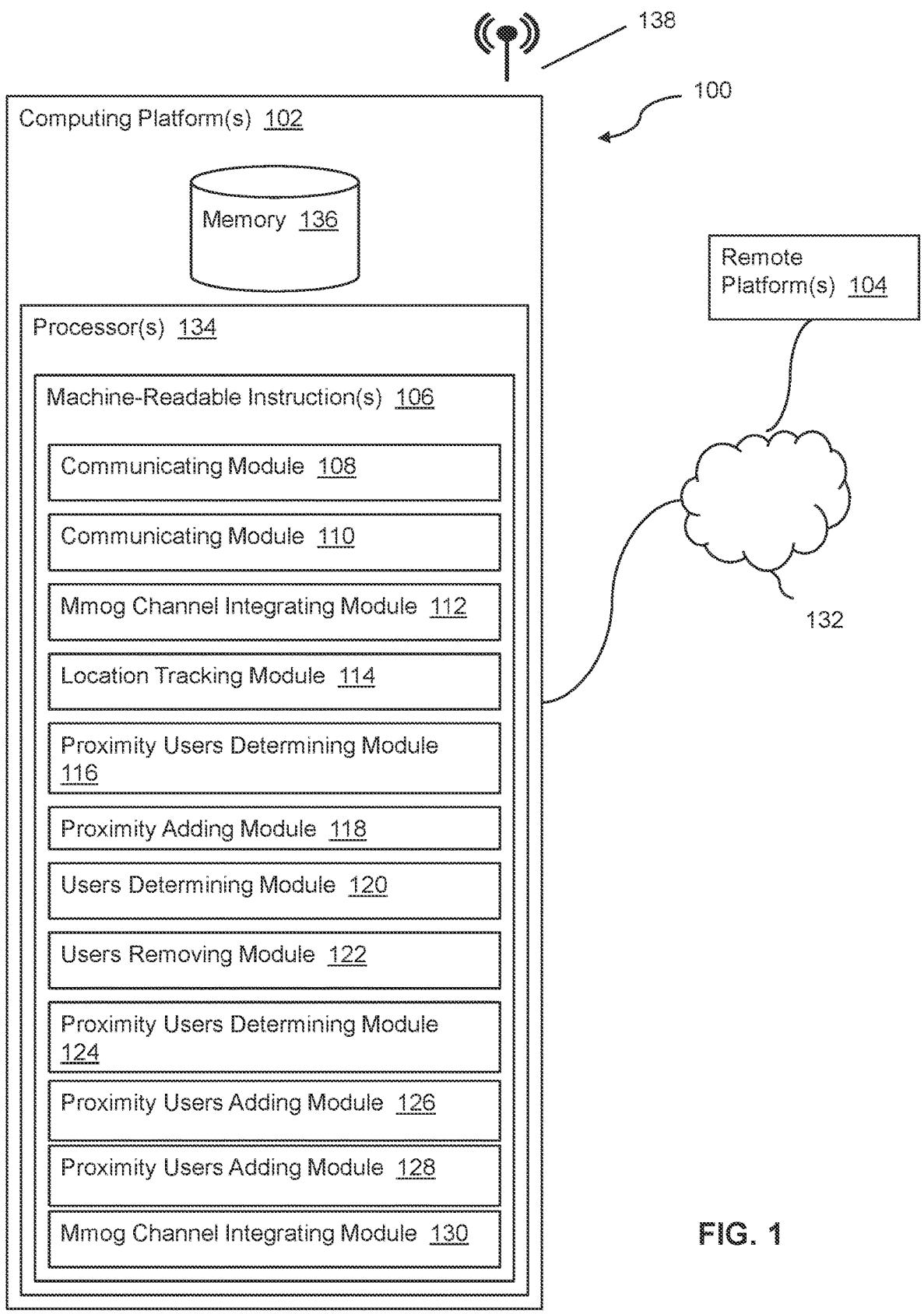
FIG. 1 illustrates a system configured for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology.

In various embodiments the present technology enables voice separated server architecture for privacy of a plurality of users of a massively multiplayer online game (MMOG) enabling a gaming computing environment that is separate from a voice channel for the plurality of users of the massively multiplayer online game (MMOG). The results of the present technology are that the act of playing a video game distracts the user/player from their natural blocks and shields that they put up with their friends, family, or professionals that are trying to help them with their mental health condition. When these blocks are active, the person (e.g., child) does not want to engage on their mental health journey. But the act of playing a game distracts the mind of the user/player and lowers their shield/block to be able to play. Especially if the game itself relates in some way to their life—for instance someone with depression playing a game with aspects of depression in it so they see it and it forms a starting point of their thoughts and then get these questions to engage further on.

In various embodiments the present technology includes an application (e.g., Liftnow application 320 of FIG. 3) that may run through custom servers. For example, a gaming server for a Massively Multiplayer Online Game, the gaming server enabling a Massively Multiplayer Online Game environment, and a voice server for the Massively Multiplayer Online Game, the voice server for the Massively Multiplayer Online Game being completely separate from the gaming server enabling privacy for a plurality of users of the massively multiplayer online game, and providing a MMOG primary voice channel. For example, a Custom MMOG Server (e.g., a custom Minecraft® server) for the gaming server for a Massively Multiplayer Online Game and a Custom Voice Server (e.g., a Discord® server) for a voice server for the Massively Multiplayer Online Game, the voice server for the Massively Multiplayer Online Game being completely separate from the gaming server enabling privacy for a plurality of users of the massively multiplayer online game, and providing a MMOG primary voice channel). For example, customized Minecraft® maps and game resources are modules that loaded on demand. Furthermore, Custom MMOG Server and a Custom Voice Server integration to both provide a communication channel before, during and after the game. Various embodiments include a lobby area where players wait before being placed into a game individually or with other players. In some instances, anonymization of players through handles to protect privacy, validation of players to ensure parental and medical authorization. In various embodiments, a game moderator is used to select players in games and to supervise games and there may be spectator role for researchers to observe or interact players in-game. Some embodiments include, research tools such as in-game questions, discussion breaks, and the like, and qualitative and quantitative data collection.

FIG. 1 illustrates a system configured for voice separated server architecture for privacy of a plurality of users of a massively multiplayer online game (MMOG) enabling a gaming computing environment that is separate from a voice channel for the plurality of users of the massively multiplayer online game (MMOG), in accordance with one or more embodiments. In some cases, system 100 may include one or more computing platforms 102. The one or more remote computing platforms 102 may be communicably coupled with one or more remote platforms 104. In some cases, users may access the system 100 via remote platform(s) 104.

The one or more computing platforms 102 may be configured by machine-readable instructions 106. Machine-readable instructions 106 may include modules. The modules may be implemented as one or more of functional logic, hardware logic, electronic circuitry, software modules, and the like. The modules may include one or more of communicating module 108, communicating module 110, MMOG channel integrating module 112, location tracking module 114, proximity users determining module 116, proximity adding module 118, users determining module 120, users removing module 122, proximity users determining module 124, proximity users adding module 126, proximity users adding module 128, MMOG channel integrating module 130, and/or other modules.

Communicating module 108 may be configured to communicate with a gaming server for a Massively Multiplayer Online Game, the gaming server enabling a Massively Multiplayer Online Game environment. Communicating module 110 may be configured to communicate with a voice server for the Massively Multiplayer Online Game, the voice server for the Massively Multiplayer Online Game being completely separate from the gaming server enabling privacy for the plurality of users of the massively multiplayer online game, and providing a MMOG primary voice channel. MMOG channel integrating module 112 may be configured to integrate the MMOG primary voice channel and the Massively Multiplayer Online Game environment, the integrating the MMOG primary voice channel and the Massively Multiplayer Online Game environment enabling a subsection of the plurality of users of the massively multiplayer online game to verbally communicate using audio communications in real-time using the MMOG primary voice channel. Location tracking module 114 may be configured to track a virtual location of each of the plurality of users of the massively multiplayer online game in the Massively Multiplayer Online Game environment. Proximity users determining module 116 may be configured to determine proximity users of the plurality of users of the massively multiplayer online game based on the tracking the virtual location of each of the plurality of users of the massively multiplayer online game in the Massively Multiplayer Online Game environment, the proximity users being in a same virtual location in the Massively Multiplayer Online Game environment as a function of a dynamic threshold. Proximity adding module 118 may be configured to add the proximity users of the plurality of users of the massively multiplayer online game to a primary user proximity cluster, the primary user proximity cluster being the subsection of the plurality of users of the massively multiplayer online game using the MMOG primary voice channel.

Users determining module 120 may be configured to determine non-proximity users of the plurality of users of the massively multiplayer online game based on the tracking the virtual location of each of the plurality of users of the massively multiplayer online game in the Massively Multiplayer Online Game environment, the non-proximity users being in different virtual locations in the Massively Multiplayer Online Game environment as a function of the dynamic threshold. Users removing module 122 may be configured to remove the non-proximity users of the plurality of users of the massively multiplayer online game from the primary user proximity cluster, the remove the non-proximity users of the plurality of users of the massively multiplayer online game from the primary user proximity cluster including removing the non-proximity users from the MMOG primary voice channel. In some cases, the dynamic threshold may be a binary proximity function; the proximity users of the plurality of users of the massively multiplayer online game satisfy the binary proximity function and may be added to the MMOG primary voice channel; and the non-proximity users of the plurality of users of the massively multiplayer online game do not satisfy the binary proximity function and may not be added to the MMOG primary voice channel and the dynamic threshold may be a sliding scale proximity function based on the tracking the virtual location of each of the plurality of users of the massively multiplayer online game in the Massively Multiplayer Online Game environment; and the proximity users of the plurality of users of the massively multiplayer online game satisfy the sliding scale proximity function and may be added to the MMOG primary voice channel and the audio communications of the proximity users may be dynamically adjusted based on the virtual location of each of the proximity users to each other.

Proximity users determining module 124 may be configured to determine dynamic proximity users of the plurality of users of the massively multiplayer online game based on the tracking the virtual location of each of the plurality of users of the massively multiplayer online game in the Massively Multiplayer Online Game environment, the dynamic proximity users being in the same virtual location in the Massively Multiplayer Online Game environment as a function of the dynamic threshold. Proximity users adding module 126 may be configured to add the dynamic proximity users of the plurality of users of the massively multiplayer online game to the primary user proximity cluster, the adding the dynamic proximity users of the plurality of users of the massively multiplayer online game to the primary user proximity cluster including adding the dynamic proximity users to the MMOG primary voice channel.

Proximity users adding module 128 may be configured to add the dynamic proximity users of the plurality of users of the massively multiplayer online game to a secondary user proximity cluster the MMOG secondary voice channel being different than the MMOG primary voice channel. MMOG channel integrating module 130 may be configured to integrate the MMOG secondary voice channel and the Massively Multiplayer Online Game environment, the integrating the MMOG secondary voice channel and the Massively Multiplayer Online Game environment enabling the dynamic proximity users of the massively multiplayer online game to verbally communicate using audio communications in real-time using the MMOG secondary voice channel.

In some cases, the voice server for the Massively Multiplayer Online Game may be a computing platform with a sole purpose of the audio communications and being completely separate from the gaming server enabling privacy for the plurality of users of the massively multiplayer online game, the computing platform with the sole purpose of the audio communications includes a privacy rules engine, the privacy rules engine including compliance with Health Insurance Portability and Accountability Act of 1996 and the audio communications in real-time using the MMOG primary voice channel may be used for a treatment plan for a mental health condition of a user of the plurality of users of the massively multiplayer online game.

In some cases, the one or more computing platforms 102, may be communicatively coupled to the remote platform(s) 104. In some cases, the communicative coupling may include communicative coupling through a networked environment 132. The networked environment 132 may be a radio access network, such as LTE or 5G, a local area network (LAN), a wide area network (WAN) such as the Internet, or wireless LAN (WLAN), for example. It will be appreciated that this is not intended to be limiting, and that the scope of this disclosure includes implementations in which one or more computing platforms 102 and remote platform(s) 104 may be operatively linked via some other communication coupling. The one or more one or more computing platforms 102 may be configured to communicate with the networked environment 132 via wireless or wired connections. In addition, in an embodiment, the one or more computing platforms 102 may be configured to communicate directly with each other via wireless or wired connections. Examples of one or more computing platforms 102 may include, but is not limited to, smartphones, wearable devices, tablets, laptop computers, desktop computers, Internet of Things (IoT) device, or other mobile or stationary devices. In an embodiment, system 100 may also include one or more hosts or servers, such as the one or more remote platforms 104 connected to the networked environment 132 through wireless or wired connections. According to one embodiment, remote platforms 104 may be implemented in or function as base stations (which may also be referred to as Node Bs or evolved Node Bs (eNBs)). In other embodiments, remote platforms 104 may include web servers, mail servers, application servers, and the like. According to certain embodiments, remote platforms 104 may be stand-alone servers, networked servers, or an array of servers.

The one or more computing platforms 102 may include one or more processors 134 for processing information and executing instructions or operations. One or more processors 134 may be any type of general or specific purpose processor. In some cases, multiple processors 134 may be utilized according to other embodiments. In fact, the one or more processors 134 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In some cases, the one or more processors 134 may be remote from the one or more computing platforms 102, such as disposed within a remote platform like the one or more remote platforms 104 of FIG. 1.

The one or more processors 134 may perform functions associated with the operation of system 100 which may include, for example, precoding of antenna gain/phase parameters, encoding and decoding of individual bits forming a communication message, formatting of information, and overall control of the one or more computing platforms 102, including processes related to management of communication resources.

The one or more computing platforms 102 may further include or be coupled to a memory 136 (internal or external), which may be coupled to one or more processors 134, for storing information and instructions that may be executed by one or more processors 134. Memory 136 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 136 can consist of any combination of random-access memory (RAM), read only memory (ROM), static storage such as a magnetic or optical disk, hard disk drive (HDD), or any other type of non-transitory machine or computer readable media. The instructions stored in memory 136 may include program instructions or computer program code that, when executed by one or more processors 134, enable the one or more computing platforms 102 to perform tasks as described herein.

In some embodiments, one or more computing platforms 102 may also include or be coupled to one or more antennas 138 for transmitting and receiving signals and/or data to and from one or more computing platforms 102. The one or more antennas 138 may be configured to communicate via, for example, a plurality of radio interfaces that may be coupled to the one or more antennas 138. The radio interfaces may correspond to a plurality of radio access technologies including one or more of LTE, 5G, WLAN, Bluetooth, near field communication (NFC), radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

Figure 2A:
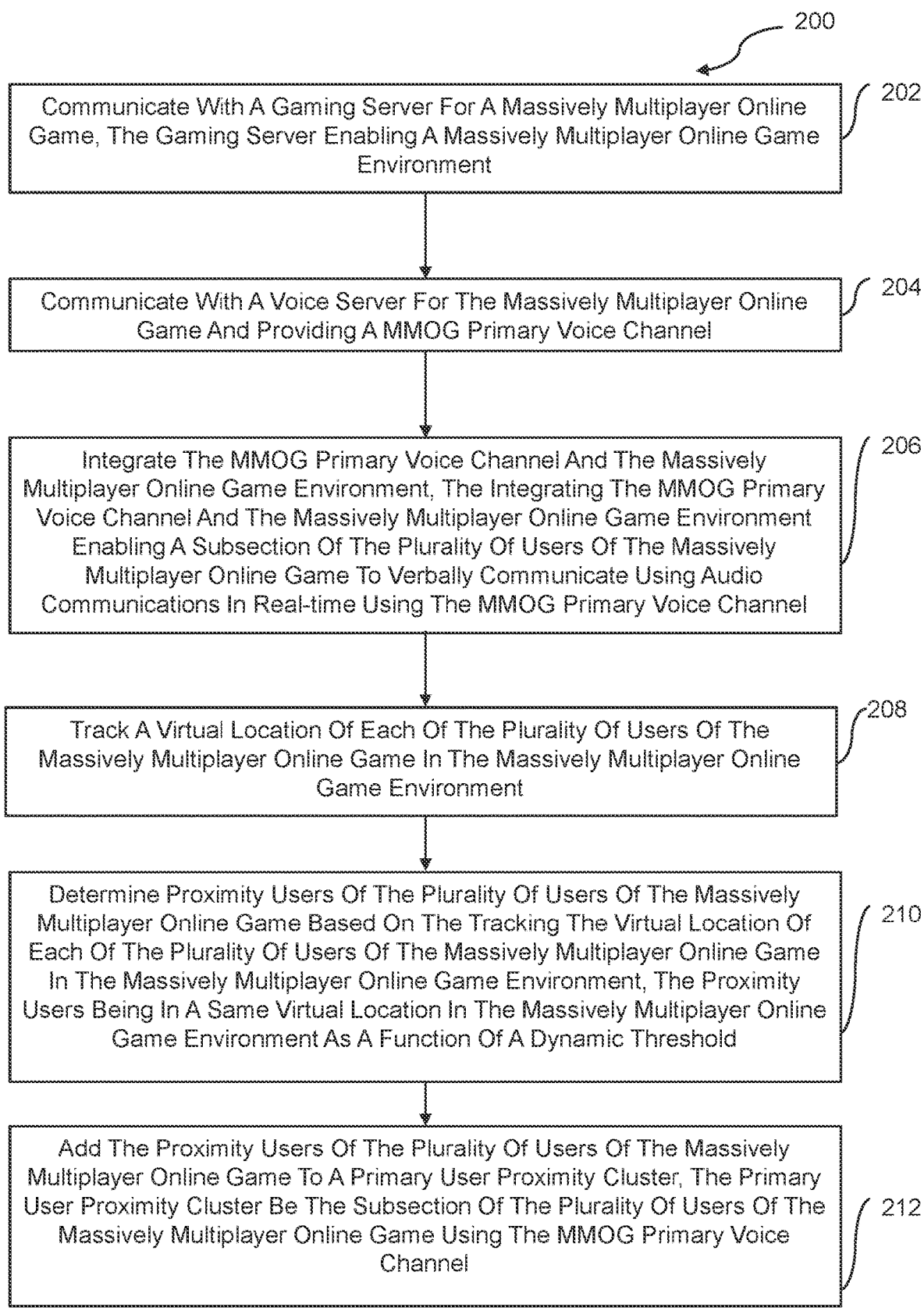
FIG. 2A, FIG. 2B, FIG. 2C, and FIG. 2D, illustrate a method for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology.
Figure 2B:
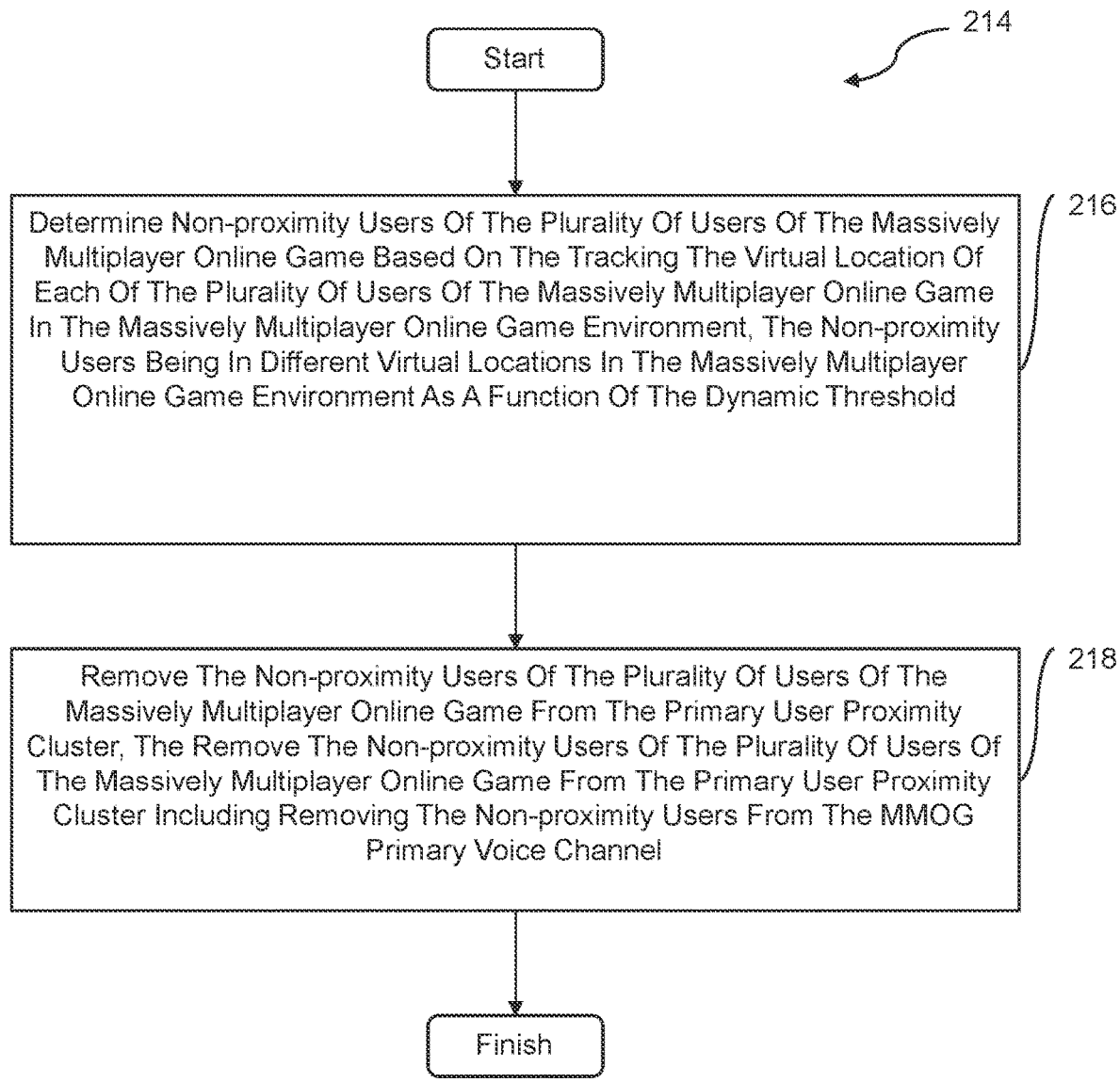
Figure 2C:
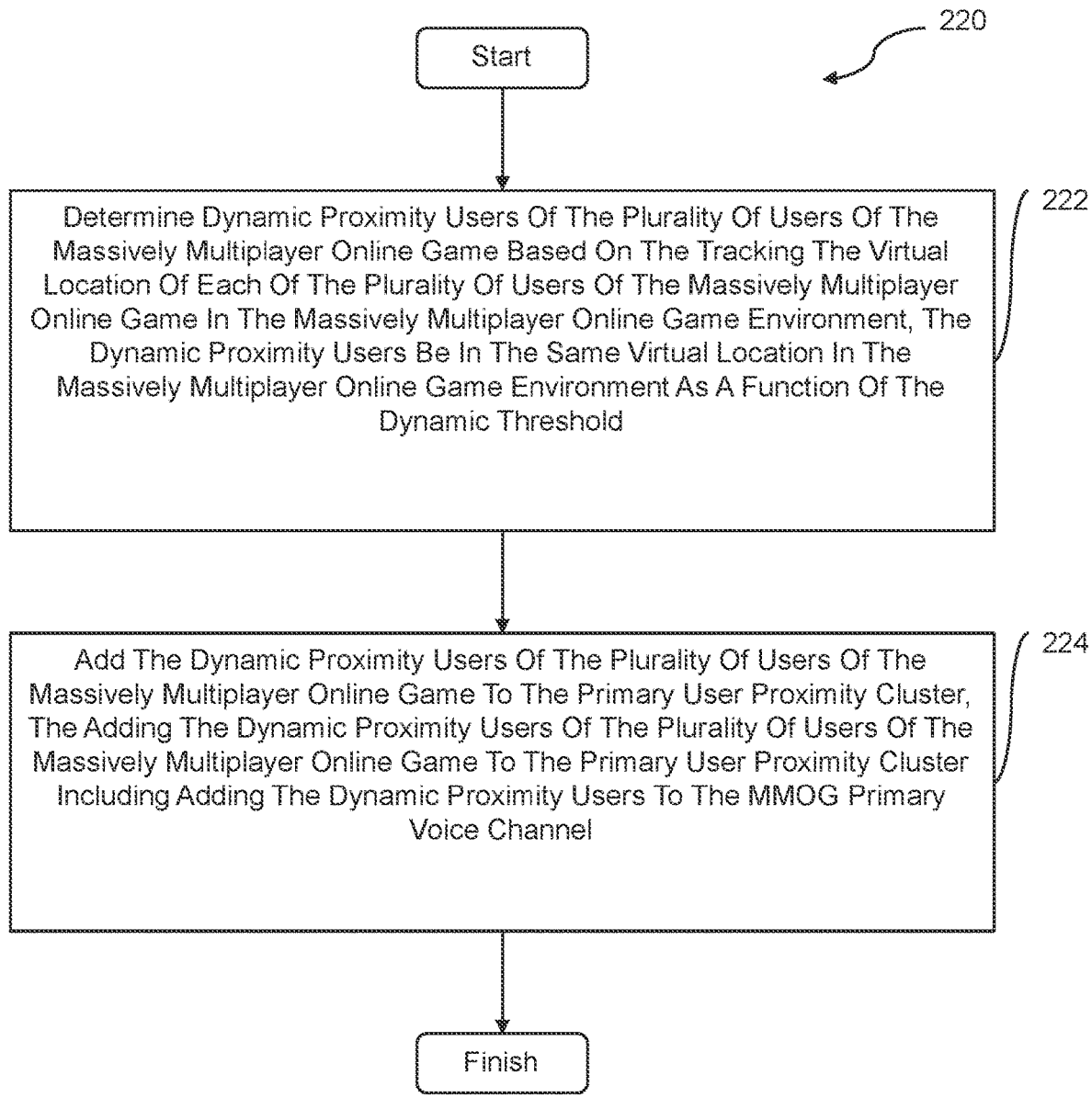
Figure 2D:
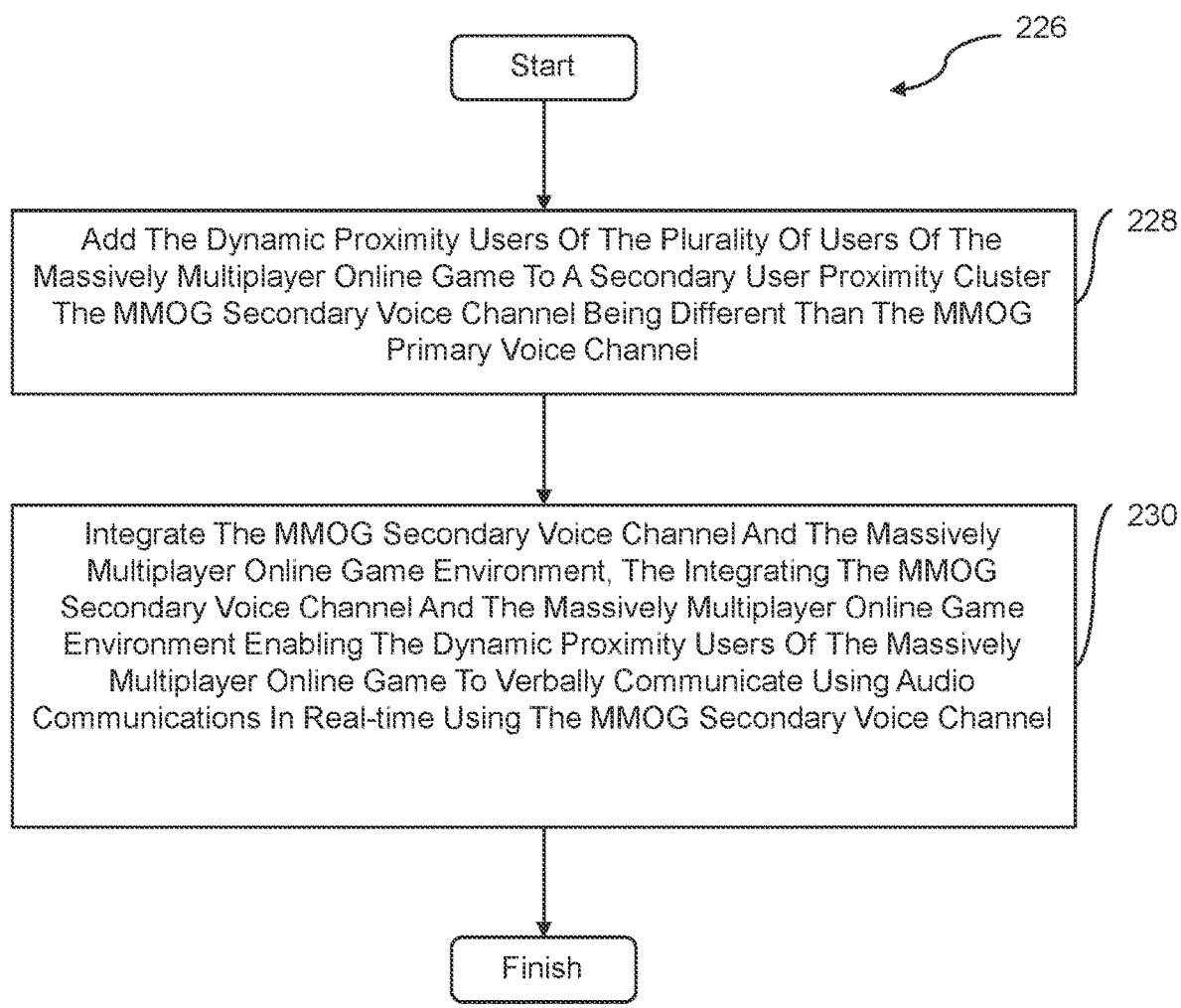

FIG. 2A, FIG. 2B, FIG. 2C and/or FIG. 2D illustrate an example flow diagram of a method 200, according to one embodiment. The method 200 may include communicating with a gaming server for a Massively Multiplayer Online Game, the gaming server enabling a Massively Multiplayer Online Game environment at block 202. The method 200 may include communicating with a voice server for the Massively Multiplayer Online Game, the voice server for the Massively Multiplayer Online Game being completely separate from the gaming server enabling privacy for the plurality of users of the massively multiplayer online game, and providing a MMOG primary voice channel at block 204. The method 200 may include integrating the MMOG primary voice channel and the Massively Multiplayer Online Game environment, the integrating the MMOG primary voice channel and the Massively Multiplayer Online Game environment enabling a subsection of the plurality of users of the massively multiplayer online game to verbally communicate using audio communications in real-time using the MMOG primary voice channel at block 206. The method 200 may include tracking a virtual location of each of the plurality of users of the massively multiplayer online game in the Massively Multiplayer Online Game environment at block 208. The method 200 may include determining proximity users of the plurality of users of the massively multiplayer online game based on the tracking the virtual location of each of the plurality of users of the massively multiplayer online game in the Massively Multiplayer Online Game environment, the proximity users being in a same virtual location in the Massively Multiplayer Online Game environment as a function of a dynamic threshold at block 210. The method 200 may include adding the proximity users of the plurality of users of the massively multiplayer online game to a primary user proximity cluster, the primary user proximity cluster being the subsection of the plurality of users of the massively multiplayer online game using the MMOG primary voice channel at block 212.

In FIG. 2B, the method 200 may be continued at 214, and may further include determining non-proximity users of the plurality of users of the massively multiplayer online game based on the tracking the virtual location of each of the plurality of users of the massively multiplayer online game in the Massively Multiplayer Online Game environment, the non-proximity users being in different virtual locations in the Massively Multiplayer Online Game environment as a function of the dynamic threshold at block 216. The method 200 continued at 214 may also further include removing the non-proximity users of the plurality of users of the massively multiplayer online game from the primary user proximity cluster, the removing the non-proximity users of the plurality of users of the massively multiplayer online game from the primary user proximity cluster including removing the non-proximity users from the MMOG primary voice channel at block 218.

In FIG. 2C, the method 200 may be continued at 220, and may further include determining dynamic proximity users of the plurality of users of the massively multiplayer online game based on the tracking the virtual location of each of the plurality of users of the massively multiplayer online game in the Massively Multiplayer Online Game environment, the dynamic proximity users being in the same virtual location in the Massively Multiplayer Online Game environment as a function of the dynamic threshold at block 222. The method 200 continued at 220 may also further include adding the dynamic proximity users of the plurality of users of the massively multiplayer online game to the primary user proximity cluster, the adding the dynamic proximity users of the plurality of users of the massively multiplayer online game to the primary user proximity cluster including adding the dynamic proximity users to the MMOG primary voice channel at block 224.

In FIG. 2D, the method 200 may be continued at 226, and may further include adding the dynamic proximity users of the plurality of users of the massively multiplayer online game to a secondary user proximity cluster the MMOG secondary voice channel being different than the MMOG primary voice channel at block 228. The method 200 continued at 226 may also further include integrating the MMOG secondary voice channel and the Massively Multiplayer Online Game environment, the integrating the MMOG secondary voice channel and the Massively Multiplayer Online Game environment enabling the dynamic proximity users of the massively multiplayer online game to verbally communicate using audio communications in real-time using the MMOG secondary voice channel at block 230.

In some cases, the method 200 may be performed by one or more hardware processors, such as the processors 134 of FIG. 1, configured by machine-readable instructions, such as the machine-readable instructions 106 of FIG. 1. In this aspect, the method 200 may be configured to be implemented by the modules, such as the modules 108, 110, 112, 114, 116, 118, 120, 122, 124, 126, 128 and/or 130 discussed above in FIG. 1.

Figure 3:
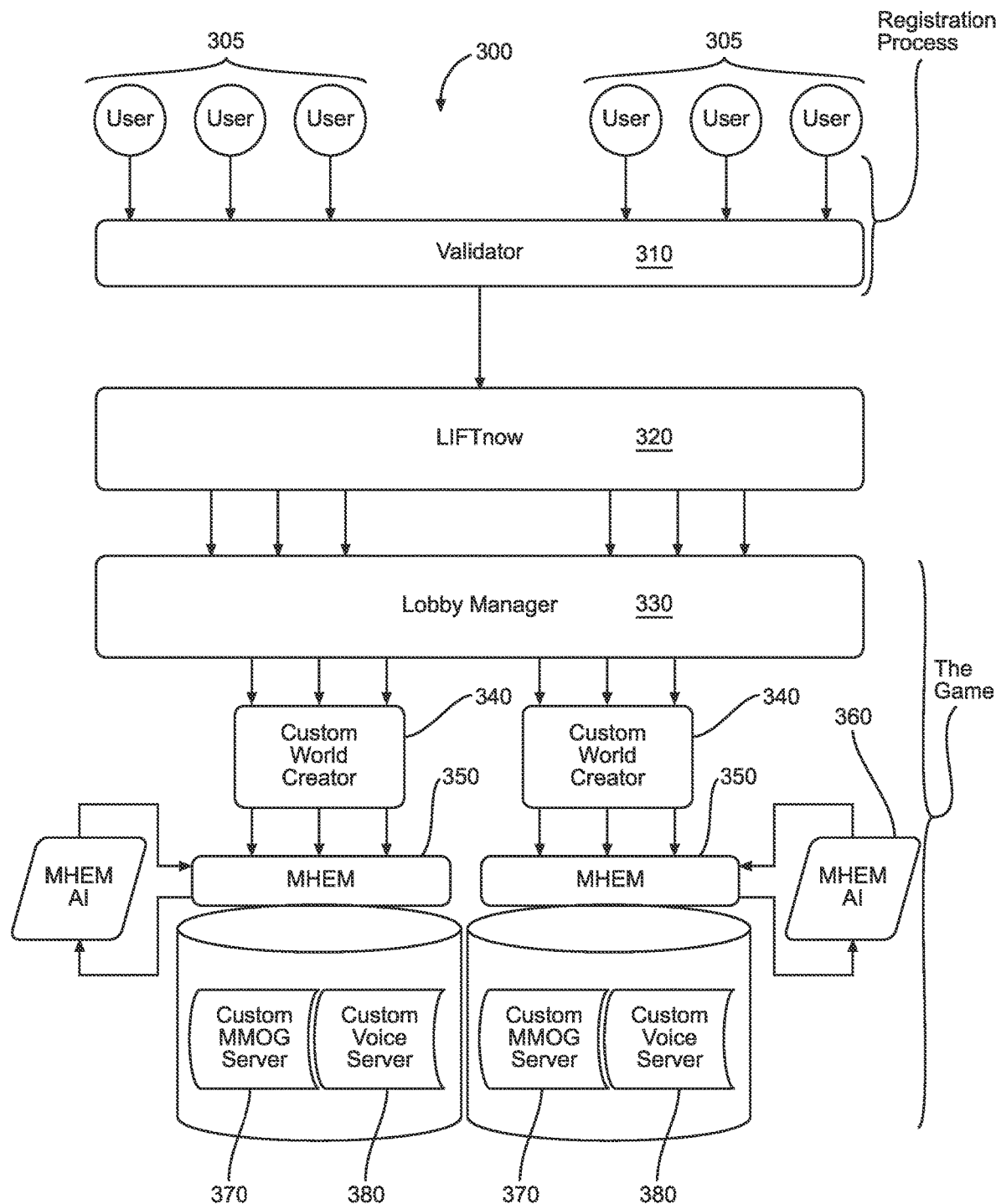
FIG. 3 illustrates a system architecture configured for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology.

FIG. 3 illustrates the system architecture 300 configured for voice separated server architecture for privacy of a plurality of users 305 of a massively multiplayer online game (MMOG) enabling a gaming computing environment that is separate from a voice channel for the plurality of users 305 of the massively multiplayer online game (MMOG), according to various embodiments of the present technology.

FIG. 3 illustrates the system architecture 300 including a plurality of users 305 of a massively multiplayer online game (MMOG), a Liftnow application Validator 310, a Liftnow application 320, Lobby Manager 330, a Custom World Creator 340, Mental Health Engagement Manager (MHEM) 350, and a Mental Health Engagement Manager Artificial Intelligence (MHEM AI) 360. The system 300 further illustrates a Custom MMOG Server 370 and a Custom Voice Server 380 for voice separated server architecture for privacy of the plurality of users 305 of a massively multiplayer online game (MMOG) enabling a gaming computing environment that is separate from a voice channel for the plurality of users of the massively multiplayer online game (MMOG), according to various embodiments of the present technology.

Separated Server Architecture.

In various embodiments Massively Multiplayer Online Game (MMOG) Voice Separated Server Architecture for Massively Multiplayer Online Games (MMOGs) voice includes the following aspects discussed below. In some embodiments, important to the approach of the present technology is the ability to own the server infrastructure to do the various functionalities described herein. For example, in some embodiments, MMOG and voice communication are available as servers rather than Software-as-a-Service (SAAS). In other words, the present technology is able to run voice separated server architecture inside a computing environment (e.g., enabling privacy of massively multi-player online games). Furthermore, the present technology may spin up and spin down a MMOG server (e.g., Custom MMOG Server 370) and a voice server (e.g., Custom Voice Server 380) on demand.

In some embodiments, the voice separated server architecture for privacy of massively multiplayer online games allows the computing environment of the present technology to be completely separate from all other users of the MMOG and voice environments (e.g., a MMOG server (e.g., Custom MMOG Server 370) and a voice server (e.g., Custom Voice Server 380)). Furthermore, the present technology including the Liftnow application 320 may enforce its own rules and processes on the users and their usage of the system which may be important for compliance with Federal regulations. For example, compliance with the Health Insurance Porta-bility and Accountability Act of 1996 ((HIPAA) i.e., the federal law that requires the creation of national standards to protect sensitive patient health information from being dis-closed without the patient's consent or knowledge and meeting various healthcare rules and regulations).

Massively Multiplayer Online Game (MMOG) and voice channel integration.

In some embodiments, the present technology integrates MMOG environment and the Voice system that is important for the overall system efficacy (e.g., a MMOG server (e.g., Custom MMOG Server 370) and a voice server (e.g., Custom Voice Server 380)). For example, during MMOG players need to be able to communicate to each other using their own personal human voice because personal human voice is important for basic human engagement. For example, personal human voice includes attributes such as emotion, subtlety, feelings, attitude, composure, and he like. All these attributes are important from a mental health standpoint since we need to know the context of the com-ment that is provided—as much as the comment itself for understanding and connection.

In some embodiments the voice server for the Massively Multiplayer Online Game (e.g., Custom Voice Server 380) is completely separate from the gaming server enabling pri-vacy for the plurality of users of the massively multiplayer online game and for decreased latency for users. For example, the technical effect of the completely separate servers (e.g., Custom MMOG Server 370 and Custom Voice Server 380) is a faster gaming environment with reduced latency for the users (e.g., users 305) that results in a faster gaming experience and servers that function more efficiently and with reduced latency.

In some embodiments, MMOG players must use personal human voice communication because MMOG players are not able to type messages to each other since they are using their hands to play the MMOG. Typically, MMOGs do not have a voice capability. There are separate Voice systems that are unconnected to anything else.

In various embodiments, the present technology inte-grates the Massively Multiplayer Online Game (MMOG) environment with the with the MMOG voice channel. In some embodiments, a veneer Application Programing Inter-face (API) layer abstracts the underlying MMOG or Voice system so that either the Massively Multiplayer Online Game (MMOG) environment and the MMOG voice channel may be swapped out since both MMOGs and Voice systems are somewhat commoditized and new systems may emerge.

In some embodiments, the present technology creates a voice channel on the voice system. For example, any user that is part of this voice channel can hear and speak to other users on the voice channel. For example, each voice channel may be its own conference call in the game environment. One challenge is that users go in and out (i.e., a user may join and then the user may drop out) of these voice channels on a dynamic basis as the users play the MMOG. For example, a capability of the present technology enables users to join and drop out of a voice channel dynamically and seamlessly.

In some embodiments, the present technology tracks the location of each player in the MMOG. For instance, are users actually users of the MMOG of the present technology at all? If they are in the MMOG of the present technology, where are they—are they in the Lobby (below) or in a specific game? For each of the Lobby and game, the present technology creates a player cluster—the list of players in that cluster and where they are in that environment. For example, each player cluster is then actively updated as the players move around in that environment. Players A, B, C, D might be in the game together. And initially players A, B, C, D are in separate portions of the game and each of them is in their own cluster of one. Each cluster has its own voice channel. As the game is played, player A may move closer to player B and at some point, the proximity function (below) will be triggered, and player A and player B will be in the same cluster and their voice channel will be the same at which point player A will be able to speak/hear player B—and vice versa. Player C might be in a separate cluster and then approach players A/B and player C will also join the same cluster and be able to join the same voice channel and players A, B, C will be able to speak/hear each other. Conversely in the game, player A might decide to move away from players B and C and when the proximity function is de-triggered, player A will leave the cluster of player B/C and go back to being in a cluster by themselves. At which point players B/C will continue to be in the same voice channel and can speak/hear each other but not player A.

In some embodiments, the proximity function is imple-mented as a simple binary (i.e., yes/no) to whether two people can speak/hear each other based on whether they are a certain distance apart from the other players in that cluster (proximate cutoff). If two players are less than the proximate cutoff distance apart, they are placed in the same cluster/voice channel. The proximate cutoff at which they are put into the same cluster/voice channel is configurable as part of the initial system setup. Each game or lobby can also have its own proximate cutoff. The game environments is three-dimensional (3D), so the distances have to be measured in 3D. In some instances, the proximity functions can also be implemented as a sliding scale as in real life where the audio is clearer/audio as the distance gets smaller and fainter/lower as the distance gets further. The audio level is adjusted down by the square of the distance to mimic how sound travels in the real world. In various embodiments, it is possible for the same player to be in multiple voice channels depending on their location. Consider the situation where three players (player A, player B, and player C) are on a straight line where player A is proximate to player B, and player B is proximate to player C, but player A is NOT proximate to player C. In this case, player A and B will be in one cluster and voice channel. And player B and C will be in another cluster/voice channel. What player A says will be heard by player B but not player C. And what player B says will be heard by both player A and C but on separate voice channels. While voice is the primary communication medium in a cluster, in addition to the voice channel, a text/chat channel may also optionally be created so players can communicate through that medium if desired.

User Management.

In some embodiments, one challenge is that since the MMOG and the Voice system have their own user management, each user of the present technology may use their respective account handles in the MMOG and Voice system. For example, when a user signs up as a user of the present technology, the user may be asked for their MMOG and Voice system user account handles and authentication data on the MMOG and Voice system allowing the present technology may keep each user logged-in logged in. If the user does not have an account in either the MMOG or the Voice system, the present technology automatically creates an account on the MMOG or Voice system or both for each user. Furthermore, while using the present technology, users are still signed up to each of the separated servers of the MMOG and the Voice system inside the environment of the present technology. But users are able interact with the MMOG and the voice system through their respective native functionality which means that they are able to make changes to the account information, personal information, settings, and the like.

In some embodiments, the gaming server for a Massively Multiplayer Online Game (MMOG) and the voice server for the Massively Multiplayer Online Game (MMOG) are completely separate servers. the present technology captures these changes inside any one of the MMOG or Voice system and then update its own user store but also propagate that change to the other system, respectively. In this approach the Liftnow application 320 own user store is a superset of the user stores of the MMOG and the Voice system even though the Liftnow application 320 is subordinated to them on any fields/settings that are in the MMOG and Voice system. For user fields/settings inside the Liftnow application 320, they are edited inside the Liftnow application 320. A different implementation of the above is that all changes for the MMOG and Voice system fields are made inside the Liftnow application 320 user settings and then propagated to the MMOG and Voice system.

The Liftnow application Validator 310.

In some embodiments, all users inside the Liftnow application 320 environment have to be validated against a set of criteria before they are allowed entry into the Liftnow application 320. For example, the criteria for being allowed into the Liftnow application 320 is set by a group of advisors who are all mental health professionals. These data points are in the form that players use to sign up to the Liftnow application 320. Each mental health professional decides on an evaluation for each of the data points based on their expertise and experience. For example, a cutoff on whether being allowed in or not from the weight function is also taken as input across the various mental health professionals. Player may enter their information to the Liftnow application 320. Examples of these fields include age, gender, condition, ever seen a professional, etc.

In some embodiments, the Liftnow application Validator 310 uses the weightage function for each of the mental health professionals and their respective cutoffs to see if this user qualifies under each of the mental health professionals and the simple majority of those qualifications are used to decide if the user is admitted or not. The advantage of this approach is that each professional's calibration system is unique, and we do not average their weightings or their cutoffs but evaluate the user in each regime and use a simple majority of those admits. In some embodiments, the Validator 310 tabulates the details provided and makes a recommendation to the Liftnow application 320 admin on the match for an individual user to be admitted. The match is provided as a percentage based on the scoring system established in a previous step. For example, an admin can accept recommendations of the Validator 310 or override the recommendation by marking the fields that the Validator 310 needs to prioritize more (change the weights). Over time this allows the Validator 310 to change the weightings based on players and their admissibility as the platform evolves. This continuous time-based evaluation/weighting is also boosted by periodic re-weighting by a panel of mental health professionals. Moreover, once a player is admitted, they are whitelisted on the separated MMOG and Voice system servers of the Liftnow application 320 environment and the players are provided a link to access these separated servers.

Lobby Manager 330.

In some embodiments, when players enter the Liftnow application 320 MMOG separated server environment, they are placed into a virtual Lobby created inside the MMOG by the Liftnow application 320. The Lobby is an environment in itself with virtual gardens and where players can wander around. For example, the Lobby may have a separated voice channel that is set up for players inside the lobby using the same proximate search approach described above. For example, players can also see a board of all the other players in the lobby as well as a listing of all the active games and the players inside those games. This board is distributed throughout the Lobby area. In some instances, players can request to be part of a game and the board also shows games that are being filled out with the partial list of players that have requested to be in that game.

In some embodiments, a Lobby Manager 330 can spawn an MMOG game world on demand and place the players who have requested to be part of that game into that world. An example would be players with the same mental health condition (say loneliness) have all signed up the loneliness game and waiting for the Lobby Manager 330 to kick off the game. The Lobby Manager 330 decides how many players can be in a game and how long to wait for new players before the spawn of the game starts.

In various embodiments, the Lobby Manager 330 decides the number of players in a game based on the system requirements (memory) of the overall the Liftnow application 320 environment. Each game world has different requirements of memory based on the constructs inside that world and the number of players playing inside that world. Based on the number of open worlds and the number of players that are waiting to play a game, the Lobby Manager 330 may optimize the overall system requirements and the waiting time of each player. Furthermore, when a game has been finished, the Lobby Manager 330 resets the world back to its original condition for a new set of players and sets all the players in that game back into the Lobby.

Custom World Creator 340.

In some embodiments the present technology (e.g., the Liftnow application 320) enables players with various mental health conditions to benefit from the platform. This is done by creating custom game worlds for players with that mental health condition. For example, a custom world for loneliness, a custom world for depression, a custom world for ADHD, and the like. For example, each custom world is created by substituting the base objects in the MMOG with the custom objects for that custom world. In various embodiments the MMOG includes the following: a base set of characters (roles)) in the game with a specific visual appearance/image (image files). Examples would be Knight or Horse; a base set of resources that be picked up and utilized during the game with their specific visual appearance (e.g., image files). Examples would be Sword or Hay. A base set of goals to be accomplished during the game by the characters using the resources. Examples could be taking over a castle or building a house. A base set of villains that will attack the characters and try to prevent them from accomplishing the goals. Examples would be dragons and sorcerers. In various embodiments, the Liftnow application 320 has created a library of objects for the characters, resources, goals, and villains that be selected by the mental health professional in designing a custom game. The professional starts with the base MMOG and starts by substituting an object in the base MMOG with an object in the Liftnow application 320 library. For example, replace any base character with "Child with depression" or "Teacher of child with depression" or "Father with substance abuse," and the like. Replace any base resource with "Lithium," "Prozac," "Weekly Counseling" etc. Replace any base goals with "helping your family with daily chores," "being kind to animals." Replace any base villains with "Covid," "Loneliness," "ADHD" etc. Based on feedback from Mental Health community, the Liftnow application 320 will continue to enhance and add to the library for characters, resources, goals, and villains for more and more mental health conditions.

In various embodiments, the actual act of substituting the custom created object differs from MMOG to MMOG depending on their specific setup and configuration. But broadly speaking the process is the following: Identify the set of resource files used by the MMOG for that base object. Create a new set of resource files representing the custom object. There will be various rules on both syntax and semantics of the resource files that have to be followed to ensure that the MMOG will accept the new custom object. In addition, there are visual steps to ensure that the new custom object looks and renders well in the MMOG and that will require adapting pixelation, image density, texture, lighting, contrast, shimmer, and a variety of other visual effects to ensure proper rendering. By creating a library of these custom objects, all of this detail is transparent to the mental health professional since they are just picking the base objects to be substituted with the custom objects and the Custom World Creator 340 makes all the changes and creates a custom world which is named by the mental health professional creating this world. The created custom world has a unique name and added to the library of custom worlds that can be spawned by the Lobby Manager 330 as required. Furthermore, Mental Health professionals can also take a custom world and customize it additionally or make other changes and save that as a new custom world. Additionally, When creating a custom world, the mental health professional can also create a list of questions specifically tailored for the custom world that is being created. The professional can specify the frequency of the questions, criteria to decide which players get asked the questions, and the like. The Game Engagement Manager may use these questions to engage with players during the game.

Mental Health Engagement Manager (MHEM) 350.

In some embodiments, in each custom world, as the players are playing the game, the MHEM 350 can insert various questions from the list associated with that custom world. These questions can be inserted to one player but not another—or to all players or some subset of players. The questions can be inserted at random intervals or based on the completion of certain tasks or the entering of certain sections of the game. For example, the MHEM 350 can insert the question to a player in the form of a billboard or some other graphic to the player or as a simple popup question as the player is playing the game. The MHEM 350 captures the player's response—voice and/or chat. And also, the response of any other players that were asked the same question at that time. Each player is given a certain time period to respond—which is configurable by the mental health professional at the time of creation of the custom world and the questions. Moreover, once the question is answered the game play goes on. Furthermore, responses can be solicited from players as a group and the players provided some time to discuss or chat about it (or the question can be configured to individual response without any discussion)—as they continue to play the game. Responses are collected both individually and as a group which enables players to say one thing in the group and one thing by themselves. For each question, the MHEM 350 can be configured to share the results with the players (A said this, B said that etc.) or not. Also, all the questions and responses are tabulated and aggregated into a datastore that can be sliced based on player, game, custom world, etc. and forms the basis of the analytics available to mental health professionals that allows players to be benchmarked against the universe of players.

Mental Health Engagement Manager Artificial Intelligence (MHEM AI) 360.

In some embodiments, based on a player's response to a question, the MHEM AI 360 can do one of two things: ask a follow-on question (take the player down a series of questions both individually or as a group) or change the game/play (stop the game, change players, add game elements, more the player to a new section of a game, move the player or others to a different game, ban the player from the platform, refer the player to a medical professional etc.). This MHEM AI 360 may be built using the following: Medical Professional rules (initial setup); Responses and outcomes across other players (analytics from above); Player feedback ("this worked for me", this was terrible", and the like); at the time of configuration of each custom world, the professional can assign weights to each of the above inputs and that drives the MHEM AI 360 decision framework.

Player Mental Health Audit Log.

In some embodiments, a log all the questions that the player has answered across all games and creates a record for the player (and for anyone that the player wants to give access to) to be able to see all the questions and answers. Note the answers might span both voice and text.

Mental Health Spectator (MHS).

In some embodiments, the Mental Health Spectator (MHS) is a special role for mental health professionals or caregivers or parent/guardians of the player or anyone else with that similar interest in the player. For example, a user on the system gets to have the MHS role through the Liftnow application Validator 310 to authenticate and ensure these professionals are legitimate. For instance, the MHS can be tied to specific custom worlds (a researcher specializing in depression) or to a specific set of players (their patients). Also, from the Lobby the MHS are able to jump into any active game that is either the custom world that they are tied to or being played by players that the MHS is tied to. The MHS cannot play in the game or perform any activity in the game. Nor can the MHS communicate with any player in the game nor change the game outcome or play in any way. But the MHS is able to watch the players playing, see the questions from the MHEM 350 and listen to the voice channels in the game and text chat in the game as well as see the player responses. In various embodiments, users/players can opt out if they do not want the MHS to be able to see their gameplay and can be set when the player creates their the Liftnow application 320 account.

Figure 4:
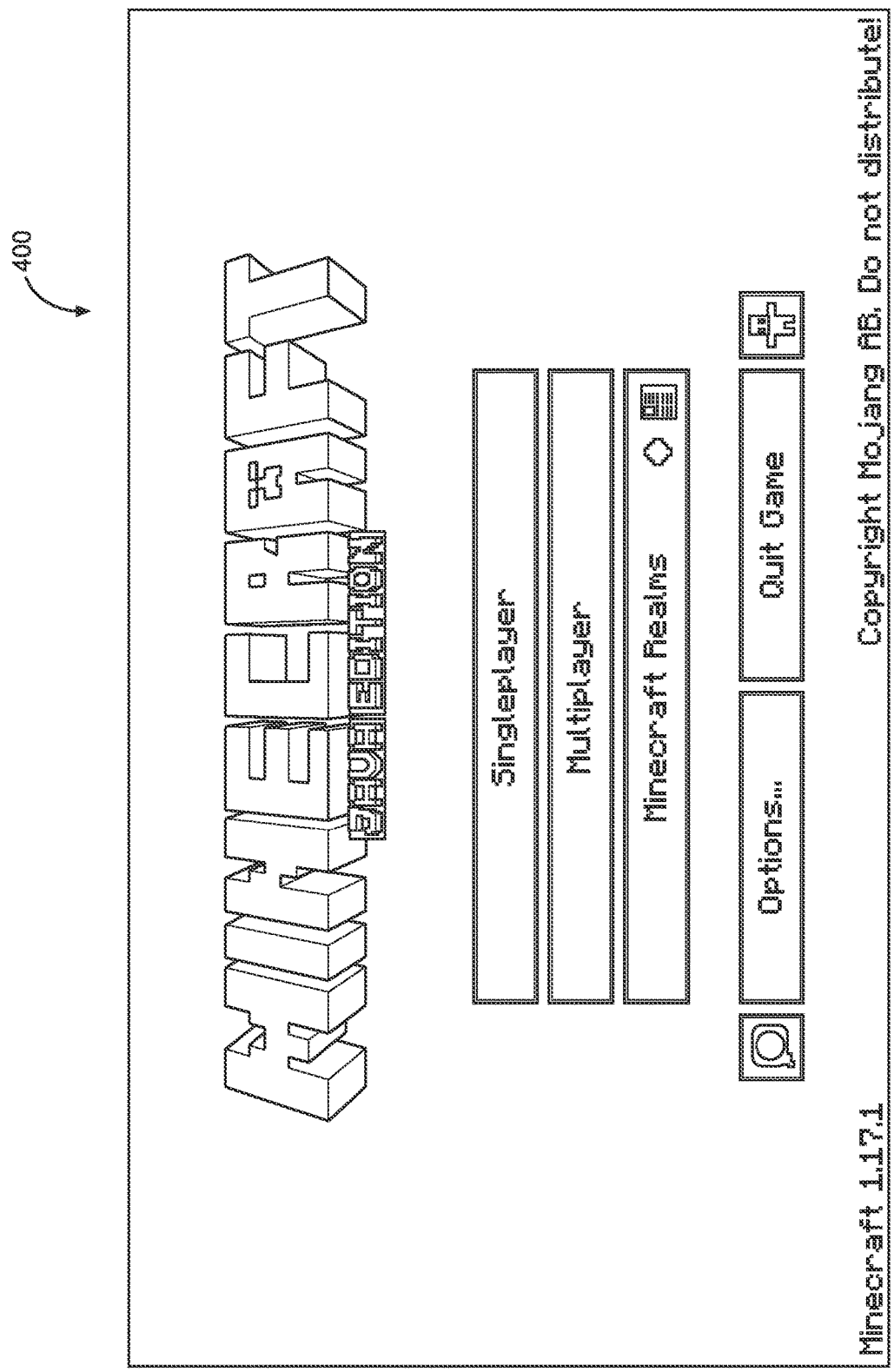
FIG. 4 illustrates a Graphical User Interface (GUI) for a method for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology.

FIG. 4 illustrates a Graphical User Interface (GUI) 400 for a method for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology.

Figure 5:
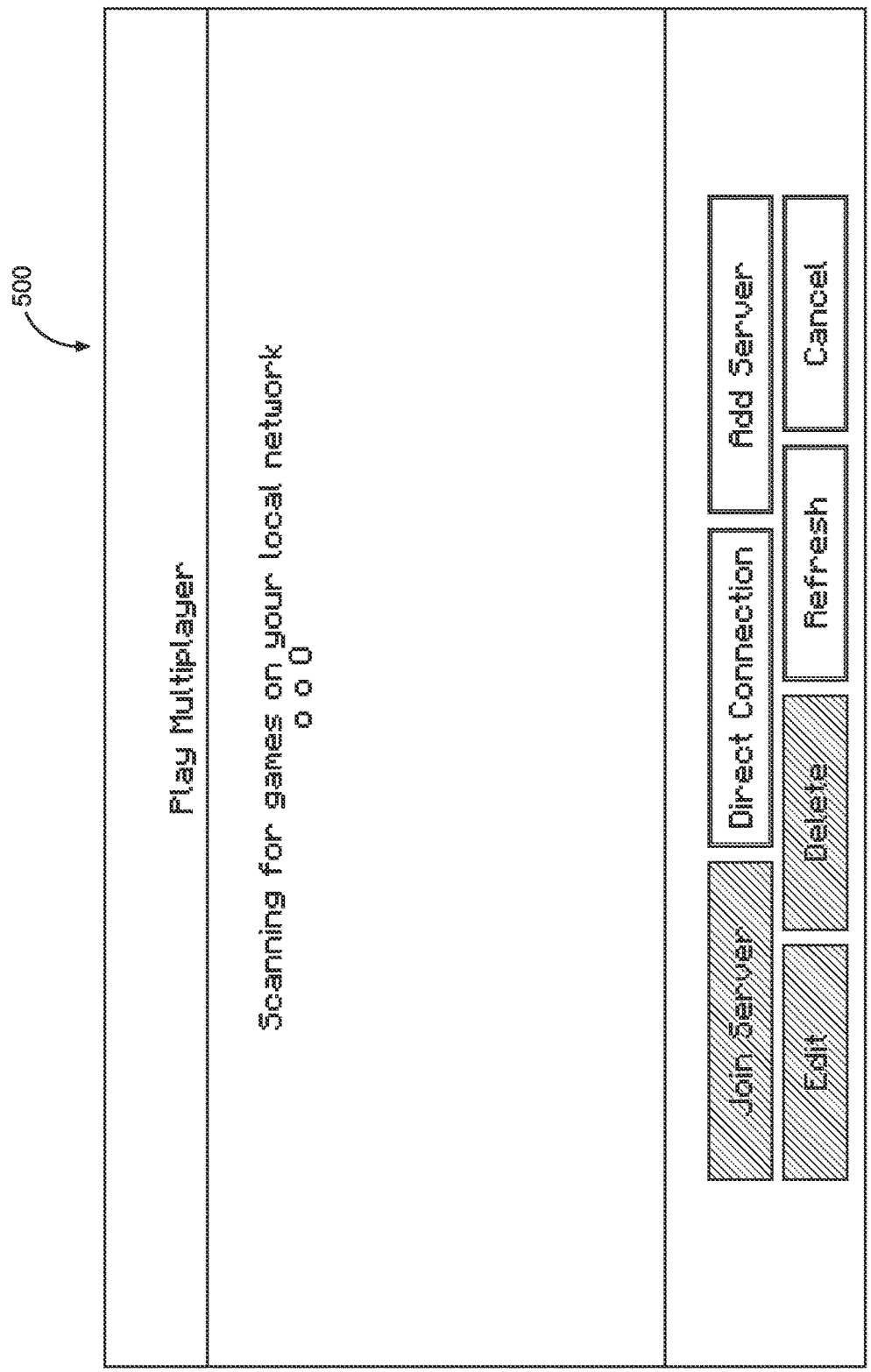
FIG. 5 illustrates a Graphical User Interface (GUI) for a method for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology.

FIG. 5 illustrates a Graphical User Interface (GUI) 500 for a method for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology.

Figure 6:
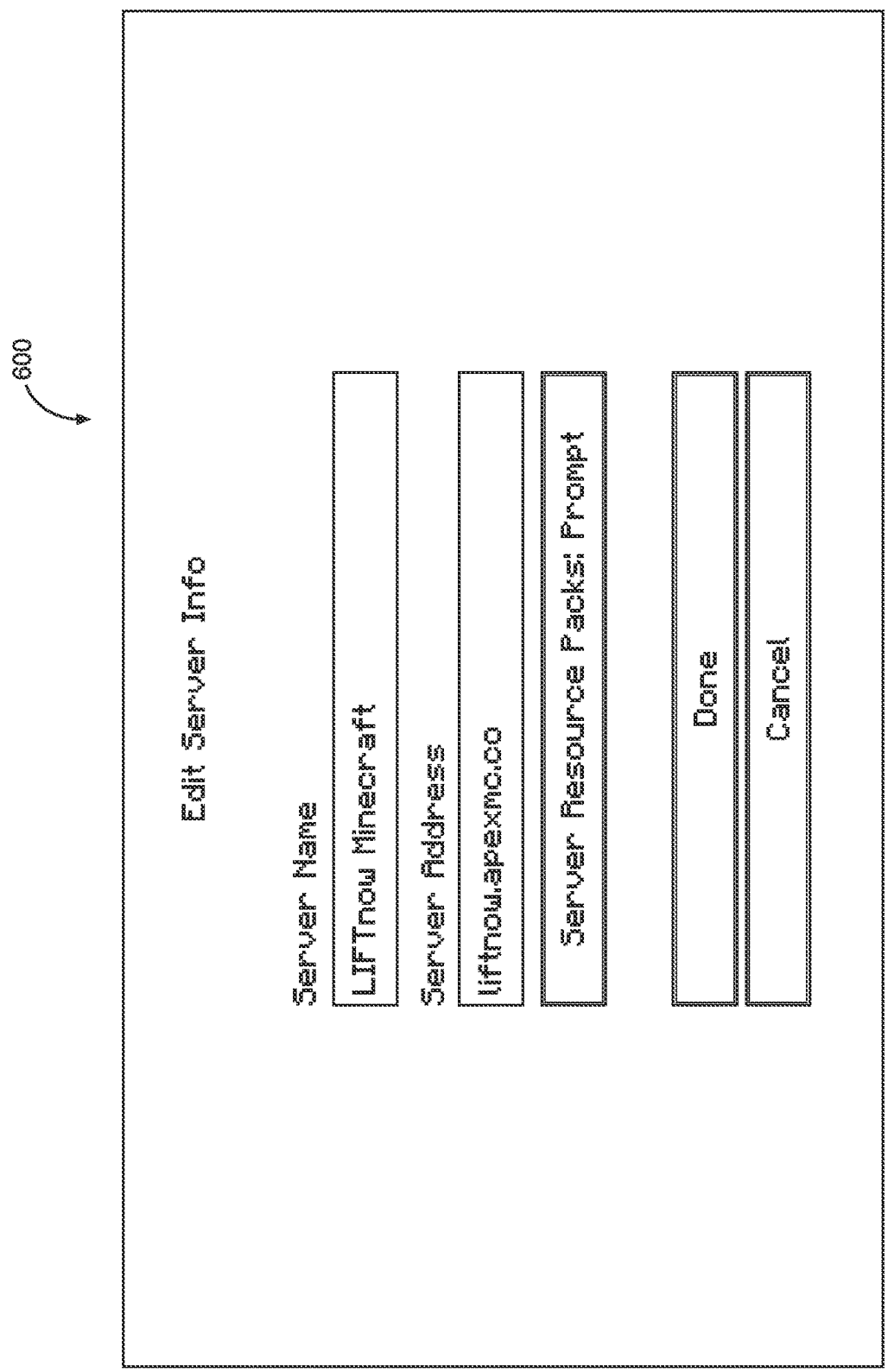
FIG. 6 illustrates a Graphical User Interface (GUI) for a method for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology.

FIG. 6 illustrates a Graphical User Interface (GUI) 600 for a method for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology.

Figure 7:
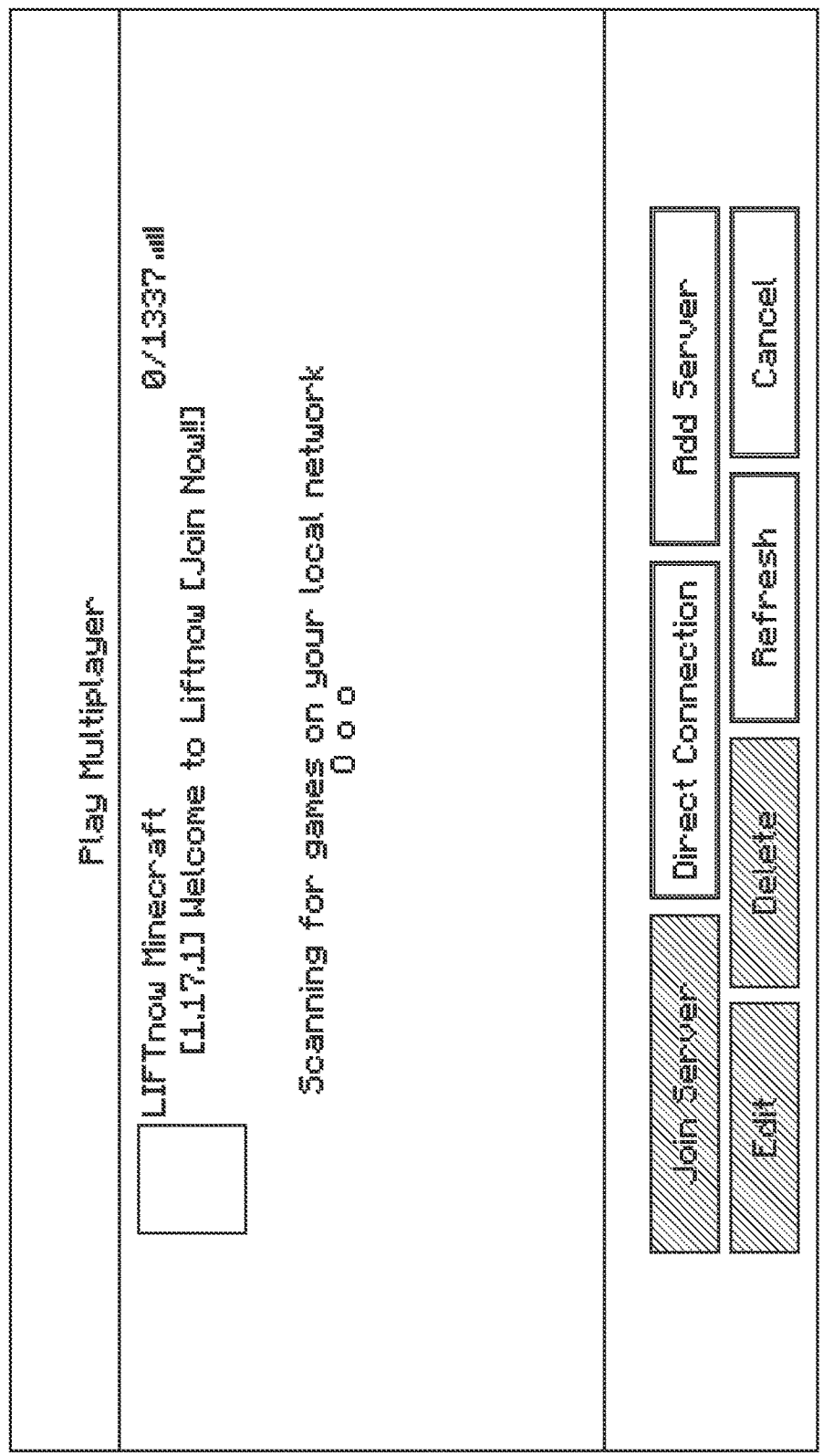
FIG. 7 illustrates a Graphical User Interface (GUI) for a method for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology.

FIG. 7 illustrates a Graphical User Interface (GUI) 700 for a method for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology. The Graphical User Interface (GUI) 700 illustrates functionalities of the Liftnow application 320.

Figure 8:
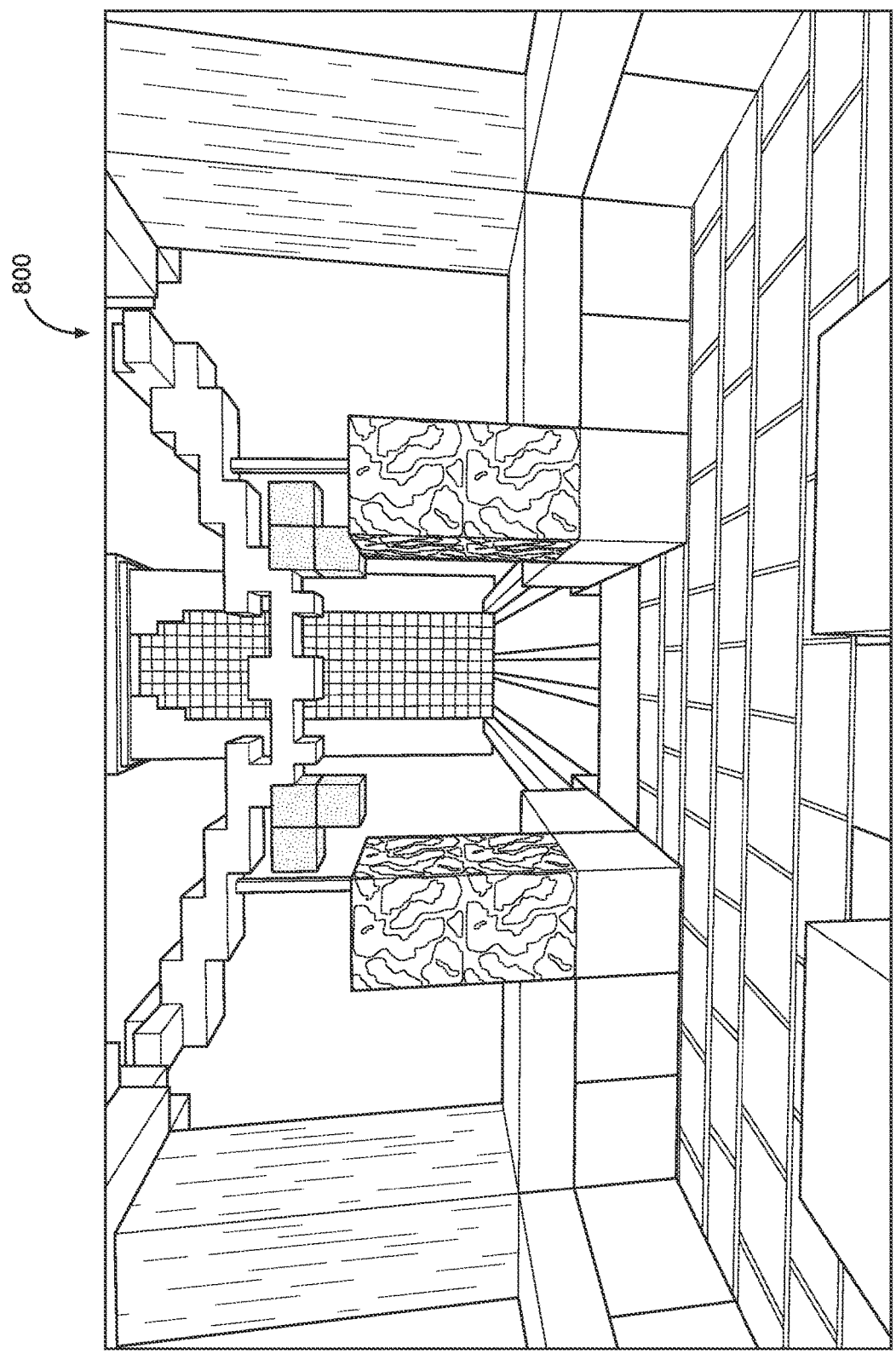
FIG. 8 illustrates a Graphical User Interface (GUI) for a method for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology.

FIG. 8 illustrates a Graphical User Interface (GUI) 800 for a method for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology. For example, the Graphical User Interface (GUI) 800 shows a Massively Multiplayer Online Game environment that may communicate with a voice server for the Massively Multiplayer Online Game, the voice server for the Massively Multiplayer Online Game being completely separate from the gaming server enabling privacy for the plurality of users of the massively multiplayer online game.

Figure 9:
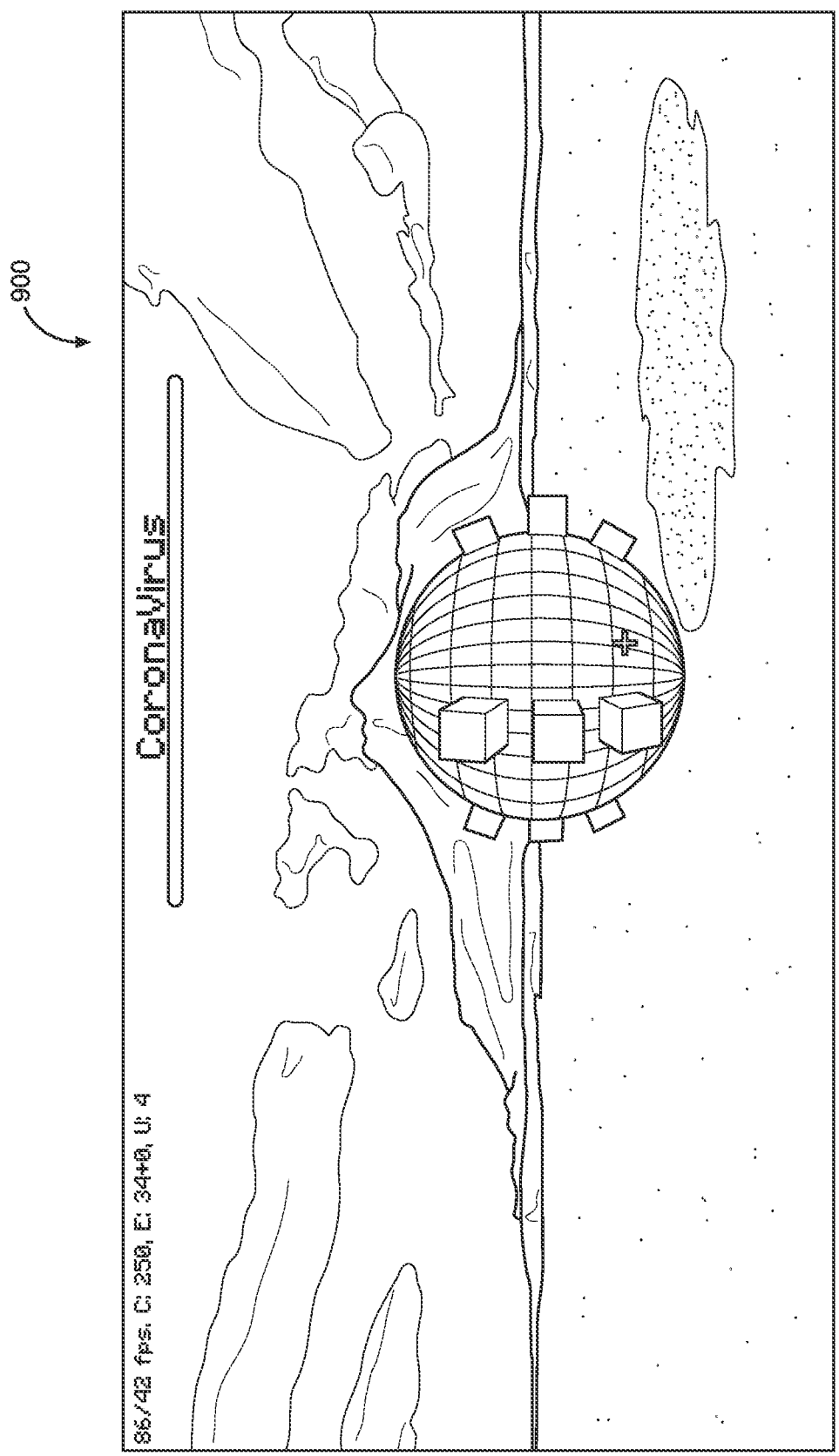
FIG. 9 illustrates a Graphical User Interface (GUI) for a method for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology.

FIG. 9 illustrates a Graphical User Interface (GUI) 900 for a method for voice separated server architecture for privacy of a plurality of users of a massively multiplayer online game (MMOG) enabling a gaming computing environment that is separate from a voice channel for the plurality of users of the massively multiplayer online game (MMOG), according to various embodiments of the present technology. For example, the Graphical User Interface (GUI) 900 shows a Massively Multiplayer Online Game environment that may communicate with a voice server for the Massively Multiplayer Online Game, the voice server for the Massively Multiplayer Online Game being completely separate from the gaming server enabling privacy for the plurality of users of the massively multiplayer online game.

SUPPORT EXAMPLES

Example 1 includes a system comprising: communicating with a gaming server for a Massively Multiplayer Online Game, the gaming server enabling a Massively Multiplayer Online Game environment, communicating with a voice server for the Massively Multiplayer Online Game, the voice server for the Massively Multiplayer Online Game being completely separate from the gaming server enabling privacy for the plurality of users of the massively multiplayer online game, and providing a MMOG primary voice channel, integrating the MMOG primary voice channel and the Massively Multiplayer Online Game environment, the integrating the MMOG primary voice channel and the Massively Multiplayer Online Game environment enabling a subsection of the plurality of users of the massively multiplayer online game to verbally communicate using audio communications in real-time using the MMOG primary voice channel, tracking a virtual location of each of the plurality of users of the massively multiplayer online game in the Massively Multiplayer Online Game environment, determining proximity users of the plurality of users of the massively multiplayer online game based on the tracking the virtual location of each of the plurality of users of the massively multiplayer online game in the Massively Multiplayer Online Game environment, the proximity users being in a same virtual location in the Massively Multiplayer Online Game environment as a function of a dynamic threshold and adding the proximity users of the plurality of users of the massively multiplayer online game to a primary user proximity cluster, the primary user proximity cluster being the subsection of the plurality of users of the massively multiplayer online game using the MMOG primary voice channel.

Example 2 includes the system of example(s) 1 and/or some other example(s) herein, further comprising: determining non-proximity users of the plurality of users of the massively multiplayer online game based on the tracking the virtual location of each of the plurality of users of the massively multiplayer online game in the Massively Multiplayer Online Game environment, the non-proximity users being in different virtual locations in the Massively Multiplayer Online Game environment as a function of the dynamic threshold; and removing the non-proximity users of the plurality of users of the massively multiplayer online game from the primary user proximity cluster, the removing the non-proximity users of the plurality of users of the massively multiplayer online game from the primary user proximity cluster including removing the non-proximity users from the MMOG primary voice channel.

Example 3 includes the system of example(s) 1 and/or some other example(s) herein, further comprising: determining dynamic proximity users of the plurality of users of the massively multiplayer online game based on the tracking the virtual location of each of the plurality of users of the massively multiplayer online game in the Massively Multiplayer Online Game environment, the dynamic proximity users being in the same virtual location in the Massively Multiplayer Online Game environment as a function of the dynamic threshold; and adding the dynamic proximity users of the plurality of users of the massively multiplayer online game to the primary user proximity cluster, the adding the dynamic proximity users of the plurality of users of the massively multiplayer online game to the primary user proximity cluster including adding the dynamic proximity users to the MMOG primary voice channel.

Example 4 includes the system of example(s) 3 and/or some other example(s) herein, further comprising: adding the dynamic proximity users of the plurality of users of the massively multiplayer online game to a secondary user proximity cluster, the adding the dynamic proximity users of the plurality of users of the massively multiplayer online game to the secondary user proximity cluster including adding the dynamic proximity users to a MMOG secondary voice channel, the MMOG secondary voice channel being different than the MMOG primary voice channel; and integrating the MMOG secondary voice channel and the Massively Multiplayer Online Game environment, the integrating the MMOG secondary voice channel and the Massively Multiplayer Online Game environment enabling the dynamic proximity users of the massively multiplayer online game to verbally communicate using audio communications in real-time using the MMOG secondary voice channel.

Example 5 includes the system of example(s) 2 and/or some other example(s) herein, wherein the dynamic threshold is a binary proximity function; the proximity users of the plurality of users of the massively multiplayer online game satisfy the binary proximity function and are added to the MMOG primary voice channel; and the non-proximity users of the plurality of users of the massively multiplayer online game do not satisfy the binary proximity function and are not added to the MMOG primary voice channel.

Example 6 includes the system of example(s) 2 and/or some other example(s) herein, wherein the dynamic threshold is a sliding scale proximity function based on the tracking the virtual location of each of the plurality of users of the massively multiplayer online game in the Massively Multiplayer Online Game environment; and the proximity users of the plurality of users of the massively multiplayer online game satisfy the sliding scale proximity function and are added to the MMOG primary voice channel and the audio communications of the proximity users are dynamically adjusted based on the virtual location of each of the proximity users to each other.

Example 7 includes the system of example(s) 1 and/or some other example(s) herein, wherein the voice server for the Massively Multiplayer Online Game is a computing platform with a sole purpose of the audio communications and being completely separate from the gaming server enabling privacy for the plurality of users of the massively multiplayer online game.

Example 8 includes the system of example(s) 7 and/or some other example(s) herein, wherein the computing platform with the sole purpose of the audio communications includes a privacy rules engine, the privacy rules engine including compliance with Health Insurance Portability and Accountability Act of 1996.

Example 9 includes the system of example(s) 1 and/or some other example(s) herein, wherein the audio communications in real-time using the MMOG primary voice channel are used for a treatment plan for a mental health condition of a user of the plurality of users of the massively multiplayer online game.

Example 10 includes a storage medium comprising: communicating with a gaming server for a Massively Multiplayer Online Game, the gaming server enabling a Massively Multiplayer Online Game environment, communicating with a voice server for the Massively Multiplayer Online Game, the voice server for the Massively Multiplayer Online Game being completely separate from the gaming server enabling privacy for the plurality of users of the massively multiplayer online game, and providing a MMOG primary voice channel, integrating the MMOG primary voice channel and the Massively Multiplayer Online Game environment, the integrating the MMOG primary voice channel and the Massively Multiplayer Online Game environment enabling a subsection of the plurality of users of the massively multiplayer online game to verbally communicate using audio communications in real-time using the MMOG primary voice channel, tracking a virtual location of each of the plurality of users of the massively multiplayer online game in the Massively Multiplayer Online Game environment, determining proximity users of the plurality of users of the massively multiplayer online game based on the tracking the virtual location of each of the plurality of users of the massively multiplayer online game in the Massively Multiplayer Online Game environment, the proximity users being in a same virtual location in the Massively Multiplayer Online Game environment as a function of a dynamic threshold and adding the proximity users of the plurality of users of the massively multiplayer online game to a primary user proximity cluster, the primary user proximity cluster being the subsection of the plurality of users of the massively multiplayer online game using the MMOG primary voice channel.

Example 11 includes the storage medium of example(s) 10 and/or some other example(s) herein, further comprising: determining non-proximity users of the plurality of users of the massively multiplayer online game based on the tracking the virtual location of each of the plurality of users of the massively multiplayer online game in the Massively Multiplayer Online Game environment, the non-proximity users being in different virtual locations in the Massively Multiplayer Online Game environment as a function of the dynamic threshold; and removing the non-proximity users of the plurality of users of the massively multiplayer online game from the primary user proximity cluster, the removing the non-proximity users of the plurality of users of the massively multiplayer online game from the primary user proximity cluster including removing the non-proximity users from the MMOG primary voice channel.

Example 12 includes the storage medium of example(s) 10 and/or some other example(s) herein, further comprising: determining dynamic proximity users of the plurality of users of the massively multiplayer online game based on the tracking the virtual location of each of the plurality of users of the massively multiplayer online game in the Massively Multiplayer Online Game environment, the dynamic proximity users being in the same virtual location in the Massively Multiplayer Online Game environment as a function of the dynamic threshold; and adding the dynamic proximity users of the plurality of users of the massively multiplayer online game to the primary user proximity cluster, the adding the dynamic proximity users of the plurality of users of the massively multiplayer online game to the primary user proximity cluster including adding the dynamic proximity users to the MMOG primary voice channel.

Example 13 includes the storage medium of example(s) 12 and/or some other example(s) herein, further comprising: adding the dynamic proximity users of the plurality of users of the massively multiplayer online game to a secondary user proximity cluster, the adding the dynamic proximity users of the plurality of users of the massively multiplayer online game to the secondary user proximity cluster including adding the dynamic proximity users to a MMOG secondary voice channel, the MMOG secondary voice channel being different than the MMOG primary voice channel; and integrating the MMOG secondary voice channel and the Massively Multiplayer Online Game environment, the integrating the MMOG secondary voice channel and the Massively Multiplayer Online Game environment enabling the dynamic proximity users of the massively multiplayer online game to verbally communicate using audio communications in real-time using the MMOG secondary voice channel.

Example 14 includes the storage medium of example(s) 11 and/or some other example(s) herein, wherein the dynamic threshold is a binary proximity function; the proximity users of the plurality of users of the massively multiplayer online game satisfy the binary proximity function and are added to the MMOG primary voice channel; and the non-proximity users of the plurality of users of the massively multiplayer online game do not satisfy the binary proximity function and are not added to the MMOG primary voice channel.

Example 15 includes the storage medium of example(s) 11 and/or some other example(s) herein, wherein the dynamic threshold is a sliding scale proximity function based on the tracking the virtual location of each of the plurality of users of the massively multiplayer online game in the Massively Multiplayer Online Game environment; and the proximity users of the plurality of users of the massively multiplayer online game satisfy the sliding scale proximity function and are added to the MMOG primary voice channel and the audio communications of the proximity users are dynamically adjusted based on the virtual location of each of the proximity users to each other.

Example 16 includes the storage medium of example(s) 10 and/or some other example(s) herein, wherein the voice server for the Massively Multiplayer Online Game is a computing platform with a sole purpose of the audio communications and being completely separate from the gaming server enabling privacy for the plurality of users of the massively multiplayer online game.

Example 17 includes the storage medium of example(s) 16 and/or some other example(s) herein, wherein the computing platform with the sole purpose of the audio communications includes a privacy rules engine, the privacy rules engine including compliance with Health Insurance Portability and Accountability Act of 1996.

Example 18 includes the storage medium of example(s) 10 and/or some other example(s) herein, wherein the audio communications in real-time using the MMOG primary voice channel are used for a treatment plan for a mental health condition of a user of the plurality of users of the massively multiplayer online game.

Example 19 includes an apparatus comprising: communicating with a gaming server for a Massively Multiplayer Online Game, the gaming server enabling a Massively Multiplayer Online Game environment, communicating with a voice server for the Massively Multiplayer Online Game, the voice server for the Massively Multiplayer Online Game being completely separate from the gaming server enabling privacy for the plurality of users of the massively multiplayer online game, and providing a MMOG primary voice channel, integrating the MMOG primary voice channel and the Massively Multiplayer Online Game environment, the integrating the MMOG primary voice channel and the Massively Multiplayer Online Game environment enabling a subsection of the plurality of users of the massively multiplayer online game to verbally communicate using audio communications in real-time using the MMOG primary voice channel, tracking a virtual location of each of the plurality of users of the massively multiplayer online game in the Massively Multiplayer Online Game environment, determining proximity users of the plurality of users of the massively multiplayer online game based on the tracking the virtual location of each of the plurality of users of the massively multiplayer online game in the Massively Multiplayer Online Game environment, the proximity users being in a same virtual location in the Massively Multiplayer Online Game environment as a function of a dynamic threshold and adding the proximity users of the plurality of users of the massively multiplayer online game to a primary user proximity cluster, the primary user proximity cluster being the subsection of the plurality of users of the massively multiplayer online game using the MMOG primary voice channel.

Example 20 includes the apparatus of example(s) 19 and/or some other example(s) herein, further comprising: determining non-proximity users of the plurality of users of the massively multiplayer online game based on the tracking the virtual location of each of the plurality of users of the massively multiplayer online game in the Massively Multiplayer Online Game environment, the non-proximity users being in different virtual locations in the Massively Multiplayer Online Game environment as a function of the dynamic threshold; and removing the non-proximity users of the plurality of users of the massively multiplayer online game from the primary user proximity cluster, the removing the non-proximity users of the plurality of users of the massively multiplayer online game from the primary user proximity cluster including removing the non-proximity users from the MMOG primary voice channel.

Example 21 includes the apparatus of example(s) 19 and/or some other example(s) herein, further comprising: determining dynamic proximity users of the plurality of users of the massively multiplayer online game based on the tracking the virtual location of each of the plurality of users of the massively multiplayer online game in the Massively Multiplayer Online Game environment, the dynamic proximity users being in the same virtual location in the Massively Multiplayer Online Game environment as a function of the dynamic threshold; and adding the dynamic proximity users of the plurality of users of the massively multiplayer online game to the primary user proximity cluster, the adding the dynamic proximity users of the plurality of users of the massively multiplayer online game to the primary user proximity cluster including adding the dynamic proximity users to the MMOG primary voice channel.

Example 22 includes the apparatus of example(s) 21 and/or some other example(s) herein, further comprising: adding the dynamic proximity users of the plurality of users of the massively multiplayer online game to a secondary user proximity cluster, the adding the dynamic proximity users of the plurality of users of the massively multiplayer online game to the secondary user proximity cluster including adding the dynamic proximity users to a MMOG secondary voice channel, the MMOG secondary voice channel being different than the MMOG primary voice channel; and integrating the MMOG secondary voice channel and the Massively Multiplayer Online Game environment, the integrating the MMOG secondary voice channel and the Massively Multiplayer Online Game environment enabling the dynamic proximity users of the massively multiplayer online game to verbally communicate using audio communications in real-time using the MMOG secondary voice channel.

Example 23 includes the apparatus of example(s) 20 and/or some other example(s) herein, wherein the dynamic threshold is a binary proximity function; the proximity users of the plurality of users of the massively multiplayer online game satisfy the binary proximity function and are added to the MMOG primary voice channel; and the non-proximity users of the plurality of users of the massively multiplayer online game do not satisfy the binary proximity function and are not added to the MMOG primary voice channel.

Example 24 includes the apparatus of example(s) 20 and/or some other example(s) herein, wherein the dynamic threshold is a sliding scale proximity function based on the tracking the virtual location of each of the plurality of users of the massively multiplayer online game in the Massively Multiplayer Online Game environment; and the proximity users of the plurality of users of the massively multiplayer online game satisfy the sliding scale proximity function and are added to the MMOG primary voice channel and the audio communications of the proximity users are dynamically adjusted based on the virtual location of each of the proximity users to each other.

Example 25 includes the apparatus of example(s) 19 and/or some other example(s) herein, wherein the voice server for the Massively Multiplayer Online Game is a computing platform with a sole purpose of the audio communications and being completely separate from the gaming server enabling privacy for the plurality of users of the massively multiplayer online game.

Example 26 includes the apparatus of example(s) 25 and/or some other example(s) herein, wherein the computing platform with the sole purpose of the audio communications includes a privacy rules engine, the privacy rules engine including compliance with Health Insurance Portability and Accountability Act of 1996.

Example 27 includes the apparatus of example(s) 19 and/or some other example(s) herein, wherein the audio communications in real-time using the MMOG primary voice channel are used for a treatment plan for a mental health condition of a user of the plurality of users of the massively multiplayer online game.

Figure 10:
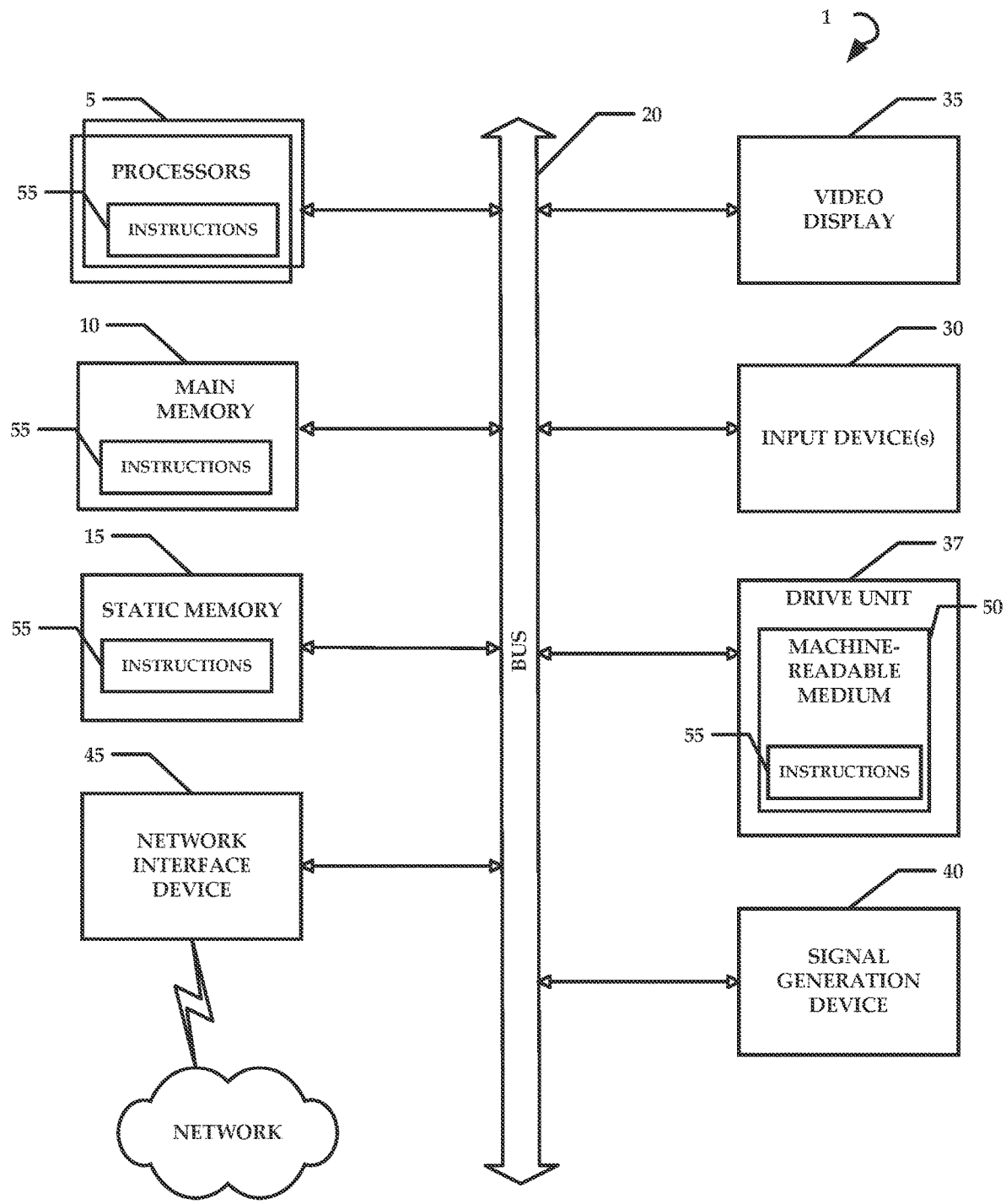
FIG. 10 is a diagrammatic representation of an exemplary system in the form of a computer system for executing various embodiments of the present technology.

FIG. 10 is a diagrammatic representation of an exemplary system in the form of a computer system 1, within which a set of instructions for causing the machine to perform any one or more of the methodologies discussed herein may be executed. In various example embodiments, the machine operates as a standalone device or may be connected (e.g., networked) to other machines. It could be executed within a Customer Relations Management ("CRM") system. In some cases, the systems and methods herein may send an API call and the like. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a smart speaker like Echo or Google Home, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system of voice separated server architecture for privacy of a plurality of users of a massively multiplayer online game (MMOG) enabling a gaming computing environment that is separate from a voice channel for the plurality of users of the massively multiplayer online game (MMOG), the system comprising:
   one or more hardware processors configured by machine-readable instructions to:
   communicate with a gaming server for a Massively Multiplayer Online Game, the gaming server enabling a Massively Multiplayer Online Game environment;
   communicate with a voice server for the Massively Multiplayer Online Game, the voice server for the Massively Multiplayer Online Game being completely separate from the gaming server enabling privacy for a plurality of users of the massively multiplayer online game, and providing a MMOG primary voice channel;
   integrate the MMOG primary voice channel and the Massively Multiplayer Online Game environment, the integrating the MMOG primary voice channel and the Massively Multiplayer Online Game environment enabling a subsection of the plurality of users of the massively multiplayer online game to verbally communicate using audio communications in real-time using the MMOG primary voice channel;
   track a virtual location of each of the plurality of users of the massively multiplayer online game in the Massively Multiplayer Online Game environment;
   determine proximity users of the plurality of users of the massively multiplayer online game based on the tracking the virtual location of each of the plurality of users of the massively multiplayer online game in the Massively Multiplayer Online Game environment, the proximity users being in a same virtual location in the Massively Multiplayer Online Game environment as a function of a dynamic threshold, the dynamic threshold comprising a binary proximity function that allows a first proximity user and a second proximity user of the plurality of users of the massively multiplayer online game to speak or hear each other when the distance between their respective virtual locations in the Massively Multiplayer Online Game environment is less than a proximity cutoff distance, the proximity cutoff distance being a pre-determined distance between the first proximity user and the second proximity user of the plurality of users of the massively multiplayer online game; and
   add the proximity users of the plurality of users of the massively multiplayer online game to a primary user proximity cluster when the distance between the respective virtual locations of the first proximity user and the second proximity user of the plurality of users of the massively multiplayer online game in the Massively Multiplayer Online Game environment is less than the proximity cutoff distance, in order to satisfy the binary proximity function, the primary user proximity cluster being the subsection of the plurality of users of the massively multiplayer online game using the MMOG primary voice channel.

2. The system as recited in claim 1, wherein the one or more hardware processors are further configured by machine-readable instructions to: determine non-proximity users of the plurality of users of the massively multiplayer online game based on the tracking the virtual location of each of the plurality of users of the massively multiplayer online game in the Massively Multiplayer Online Game environment, the non-proximity users being in different virtual locations in the Massively Multiplayer Online Game environment as a function of the dynamic threshold; and remove the non-proximity users of the plurality of users of the massively multiplayer online game from the primary user proximity cluster, the remove the non-proximity users of the plurality of users of the massively multiplayer online game from the primary user proximity cluster including removing the non-proximity users from the MMOG primary voice channel.

3. The system as recited in claim 2, wherein the non-proximity users of the plurality of users of the massively multiplayer online game (MMOG) do not satisfy the binary proximity function and are not added to the MMOG primary voice channel.

4. The system as recited in claim 1, wherein the one or more hardware processors are further configured by machine-readable instructions to: determine dynamic proximity users of the plurality of users of the massively multiplayer online game based on the tracking the virtual location of each of the plurality of users of the massively multiplayer online game in the Massively Multiplayer Online Game environment, the dynamic proximity users be in the same virtual location in the Massively Multiplayer Online Game environment as a function of the dynamic threshold; and add the dynamic proximity users of the plurality of users of the massively multiplayer online game to the primary user proximity cluster, the adding the dynamic proximity users of the plurality of users of the massively multiplayer online game to the primary user proximity cluster including adding the dynamic proximity users to the MMOG primary voice channel.

5. The system as recited in claim 4, wherein the one or more hardware processors are further configured by machine-readable instructions to: add the dynamic proximity users of the plurality of users of the massively multiplayer online game to a secondary user proximity cluster, the adding the dynamic proximity users of the plurality of users of the massively multiplayer online game to the secondary user proximity cluster including adding the dynamic proximity users to a MMOG secondary voice channel, the MMOG secondary voice channel being different than the MMOG primary voice channel; and integrate the MMOG secondary voice channel and the Massively Multiplayer Online Game environment, the integrating the MMOG secondary voice channel and the Massively Multiplayer Online Game environment enabling the dynamic proximity users of the massively multiplayer online game to verbally communicate using audio communications in real-time using the MMOG secondary voice channel.

6. The system as recited in claim 1, wherein the voice server for the Massively Multiplayer Online Game (MMOG) is a computing platform with a sole purpose of the audio communications and being completely separate from the gaming server enabling privacy for the plurality of users of the massively multiplayer online game (MMOG).

7. The system as recited in claim 6, wherein the computing platform with the sole purpose of the audio communications includes a privacy rules engine, the privacy rules engine including compliance with Health Insurance Portability and Accountability Act of 1996 (HIPAA).

8. The system as recited in claim 1, wherein the audio communications in real-time using the MMOG primary voice channel are used for a treatment plan for a mental health condition of a user of the plurality of users of the massively multiplayer online game (MMOG).

9. A non-transitory computer-readable storage medium comprising instructions being executable by one or more processors to perform a method of voice separated server architecture for privacy of a plurality of users of a massively multiplayer online game (MMOG) enabling a gaming computing environment that is separate from a voice channel for the plurality of users of the massively multiplayer online game (MMOG), the method comprising:
communicating with a gaming server for a Massively Multiplayer Online Game, the gaming server enabling a Massively Multiplayer Online Game environment;
communicating with a voice server for the Massively Multiplayer Online Game, the voice server for the Massively Multiplayer Online Game being completely separate from the gaming server enabling privacy for the plurality of users of the massively multiplayer online game, and providing a MMOG primary voice channel;
integrating the MMOG primary voice channel and the Massively Multiplayer Online Game environment, the integrating the MMOG primary voice channel and the Massively Multiplayer Online Game environment enabling a subsection of the plurality of users of the massively multiplayer online game to verbally communicate using audio communications in real-time using the MMOG primary voice channel;
tracking a virtual location of each of the plurality of users of the massively multiplayer online game in the Massively Multiplayer Online Game environment;
determining proximity users of the plurality of users of the massively multiplayer online game based on the tracking the virtual location of each of the plurality of users of the massively multiplayer online game in the Massively Multiplayer Online Game environment, the proximity users being in a same virtual location in the Massively Multiplayer Online Game environment as a function of a dynamic threshold, the dynamic threshold comprising a binary proximity function that allows a first proximity user and a second proximity user of the plurality of users of the massively multiplayer online game to speak or hear each other when the distance between their respective virtual locations in the Massively Multiplayer Online Game environment is less than a proximity cutoff distance, the proximity cutoff distance being a pre-determined distance between the first proximity user and the second proximity user of the plurality of users of the massively multiplayer online game; and
adding the proximity users of the plurality of users of the massively multiplayer online game to a primary user proximity cluster when the distance between the respective virtual locations of the first proximity user and the second proximity user of the plurality of users of the massively multiplayer online game in the Massively Multiplayer Online Game environment is less than the proximity cutoff distance, in order to satisfy the binary proximity function, the primary user proximity cluster being the subsection of the plurality of users of the massively multiplayer online game using the MMOG primary voice channel.

10. The computer-readable storage medium as recited in claim 9, wherein the at least one memory and the computer program code are further configured to, with the processor, cause the computer-readable storage medium to determine non-proximity users of the plurality of users of the massively multiplayer online game based on the tracking the virtual location of each of the plurality of users of the massively multiplayer online game in the Massively Multiplayer Online Game environment, the non-proximity users being in different virtual locations in the Massively Multiplayer Online Game environment as a function of the dynamic threshold; and remove the non-proximity users of the plurality of users of the massively multiplayer online game from the primary user proximity cluster, the remove the non-proximity users of the plurality of users of the massively multiplayer online game from the primary user proximity cluster including removing the non-proximity users from the MMOG primary voice channel.

11. The computer-readable storage medium as recited in claim 10, wherein the non-proximity users of the plurality of users of the massively multiplayer online game (MMOG) do not satisfy the binary proximity function and are not added to the MMOG primary voice channel.

12. The computer-readable storage medium as recited in claim 9, wherein the at least one memory and the computer program code are further configured to, with the processor, cause the computer-readable storage medium to determine dynamic proximity users of the plurality of users of the massively multiplayer online game based on the tracking the virtual location of each of the plurality of users of the massively multiplayer online game in the Massively Multiplayer Online Game environment, the dynamic proximity users being in the same virtual location in the Massively Multiplayer Online Game environment as a function of the dynamic threshold; and add the dynamic proximity users of the plurality of users of the massively multiplayer online game to the primary user proximity cluster, the adding the dynamic proximity users of the plurality of users of the massively multiplayer online game to the primary user proximity cluster including adding the dynamic proximity users to the MMOG primary voice channel.

13. The computer-readable storage medium as recited in claim 12, wherein the at least one memory and the computer program code are further configured to, with the processor, cause the computer-readable storage medium to add the dynamic proximity users of the plurality of users of the massively multiplayer online game to a secondary user proximity cluster, the adding the dynamic proximity users of the plurality of users of the massively multiplayer online game to the secondary user proximity cluster including adding the dynamic proximity users to a MMOG secondary voice channel, the MMOG secondary voice channel being different than the MMOG primary voice channel; and integrate the MMOG secondary voice channel and the Massively Multiplayer Online Game environment, the integrating the MMOG secondary voice channel and the Massively Multiplayer Online Game environment enabling the dynamic proximity users of the massively multiplayer online game to verbally communicate using audio communications in real-time using the MMOG secondary voice channel.

14. The computer-readable storage medium as recited in claim 9, wherein the voice server for the Massively Multiplayer Online Game (MMOG) is a computing platform with a sole purpose of the audio communications and being completely separate from the gaming server enabling privacy for the plurality of users of the massively multiplayer online game (MMOG).

15. The computer-readable storage medium as recited in claim 14, wherein the computing platform with the sole purpose of the audio communications includes a privacy rules engine, the privacy rules engine including compliance with Health Insurance Portability and Accountability Act of 1996 (HIPAA).

16. The computer-readable storage medium as recited in claim 9, wherein the audio communications in real-time using the MMOG primary voice channel are used for a treatment plan for a mental health condition of a user of the plurality of users of the massively multiplayer online game (MMOG).

17. An apparatus of voice separated server architecture for privacy of a plurality of users of a massively multiplayer online game (MMOG) enabling a gaming computing environment that is separate from a voice channel for the plurality of users of the massively multiplayer online game (MMOG), the apparatus comprising:
  at least one memory storing computer program instructions; and
  at least one processor configured to execute the computer program instructions to cause the apparatus at least to:
    communicate with a gaming server for a Massively Multiplayer Online Game, the gaming server enabling a Massively Multiplayer Online Game environment;
    communicate with a voice server for the Massively Multiplayer Online Game, the voice server for the Massively Multiplayer Online Game being completely separate from the gaming server enabling privacy for the plurality of users of the massively multiplayer online game, and providing a MMOG primary voice channel;
    integrate the MMOG primary voice channel and the Massively Multiplayer Online Game environment, the integrating the MMOG primary voice channel and the Massively Multiplayer Online Game environment enabling a subsection of the plurality of users of the massively multiplayer online game to verbally communicate using audio communications in real-time using the MMOG primary voice channel;
    track a virtual location of each of the plurality of users of the massively multiplayer online game in the Massively Multiplayer Online Game environment;
    determine proximity users of the plurality of users of the massively multiplayer online game based on the tracking the virtual location of each of the plurality of users of the massively multiplayer online game in the Massively Multiplayer Online Game environment, the proximity users being in a same virtual location in the Massively Multiplayer Online Game environment as a function of a dynamic threshold, the dynamic threshold comprising a binary proximity function that allows a first proximity user and a second proximity user of the plurality of users of the massively multiplayer online game to speak or hear each other when the distance between their respective virtual locations in the Massively Multiplayer Online Game environment is less than a proximity cutoff distance, the proximity cutoff distance being a pre-determined distance between the first proximity user and the second proximity user of the plurality of users of the massively multiplayer online game; and
    add the proximity users of the plurality of users of the massively multiplayer online game to a primary user proximity cluster when the distance between the respective virtual locations of the first plurality user and the second plurality user of the plurality of users of the massively multiplayer online game in the Massively Multiplayer Online Game environment is less than the proximity cutoff distance, in order to satisfy the binary proximity function, the primary user proximity cluster being the subsection of the plurality of users of the massively multiplayer online game using the MMOG primary voice channel.

18. The apparatus as recited in claim 17, wherein the audio communications in real-time using the MMOG primary voice channel are used for a treatment plan for a mental health condition of a user of the plurality of users of the massively multiplayer online game (MMOG).

* * * * *